US008988456B2

(12) United States Patent
Hanson et al.

(10) Patent No.: US 8,988,456 B2
(45) Date of Patent: Mar. 24, 2015

(54) GENERATING DIGITAL MEDIA PRESENTATION LAYOUTS DYNAMICALLY BASED ON IMAGE FEATURES

(75) Inventors: Eric Hanson, Emeryville, CA (US); Joshua David Fagans, Redwood City, CA (US); William Martin Bachman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 633 days.

(21) Appl. No.: 12/893,482

(22) Filed: Sep. 29, 2010

(65) Prior Publication Data

US 2011/0234613 A1    Sep. 29, 2011

Related U.S. Application Data

(60) Provisional application No. 61/317,511, filed on Mar. 25, 2010.

(51) Int. Cl.
*G09G 5/30*       (2006.01)
*G06F 17/30*    (2006.01)

(52) U.S. Cl.
CPC ............................. *G06F 17/30265* (2013.01)
USPC ........................................................ 345/619

(58) Field of Classification Search
CPC .................................................... G06T 11/60
USPC ........................................................ 345/619
See application file for complete search history.

(56) References Cited

U.S. PATENT DOCUMENTS

| | | | |
|---|---|---|---|
| 5,727,129 A * | 3/1998 | Barrett et al. | ................... 706/10 |
| 5,812,128 A | 9/1998 | Sterling | |
| 5,818,437 A | 10/1998 | Grover | |
| 5,880,722 A | 3/1999 | Brewer | |
| 6,018,774 A | 1/2000 | Mayle | |
| 6,160,553 A | 12/2000 | Robertson | |
| 6,249,316 B1 | 6/2001 | Anderson | |
| 6,339,429 B1 * | 1/2002 | Schug | ........................... 345/589 |

(Continued)

FOREIGN PATENT DOCUMENTS

| | | |
|---|---|---|
| CN | 1979488 A | 6/2007 |
| EP | 0576030 | 12/1993 |

(Continued)

OTHER PUBLICATIONS

Adelman, Kenneth & Gabrielle, California Coastal Protection Network, California Coastal Records Project—Aerial Photographs of the California Coastline, [online], Copyright 2002-2006 Kenneth & Gabrielle Adelman, retrieved Jul. 5, 2007, 1 page.

(Continued)

*Primary Examiner* — Javid A Amini
(74) *Attorney, Agent, or Firm* — Wong, Cabello, Lutsch, Rutherford & Brucculeri, LLP

(57) ABSTRACT

Methods, apparatuses, and systems for generating digital media presentation layouts dynamically based on image features. Multiple digital images are received. Features are identified for one or more of the digital images based on metadata associated with and content included in the digital images. Significance measures are associated with the one or more digital images based on the features. A digital presentation of the one or more digital images is generated and the digital images are displayed according to the significance measures associated with the respective digital images.

28 Claims, 8 Drawing Sheets

(56) References Cited

U.S. PATENT DOCUMENTS

| | | |
|---|---|---|
| 6,374,260 B1 | 4/2002 | Hoffert |
| 6,408,301 B1 | 6/2002 | Patton |
| 6,437,797 B1 | 8/2002 | Ota |
| 6,490,370 B1 | 12/2002 | Krasinski |
| 6,542,936 B1 | 4/2003 | Mayle |
| 6,545,687 B2 | 4/2003 | Scott |
| 6,700,612 B1 | 3/2004 | Anderson |
| 6,734,909 B1 | 5/2004 | Terane |
| 6,741,864 B2 | 5/2004 | Wilcock |
| 6,871,231 B2 | 3/2005 | Morris |
| 6,904,160 B2 | 6/2005 | Burgess |
| 6,912,327 B1 | 6/2005 | Hori |
| 6,919,910 B2 | 7/2005 | Chang |
| 7,020,848 B2 | 3/2006 | Rosenzweig |
| 7,146,576 B2 | 12/2006 | Chang |
| 7,148,990 B2 | 12/2006 | Atkins et al. |
| 7,162,488 B2 | 1/2007 | DeVorchik |
| 7,203,367 B2 | 4/2007 | Shniberg |
| 7,243,101 B2 | 7/2007 | Itou |
| 7,362,919 B2 | 4/2008 | Das et al. |
| 7,437,005 B2 | 10/2008 | Drucker |
| 7,474,801 B2* | 1/2009 | Teo et al. .................. 382/284 |
| 7,555,165 B2 | 6/2009 | Luo |
| 7,557,818 B1* | 7/2009 | Ubillos et al. .............. 345/684 |
| 7,629,984 B2 | 12/2009 | Reid et al. |
| 7,663,671 B2 | 2/2010 | Gallagher |
| 7,680,340 B2 | 3/2010 | Luo |
| 7,707,517 B2 | 4/2010 | Bier |
| 7,747,074 B2 | 6/2010 | Yamakado |
| 7,796,779 B1* | 9/2010 | Strong et al. .................. 382/100 |
| 7,839,420 B2 | 11/2010 | Ubillos |
| 7,978,936 B1 | 7/2011 | Casillas |
| 8,009,919 B2* | 8/2011 | Baiping et al. .............. 382/225 |
| 8,013,874 B2* | 9/2011 | Reid et al. .................. 345/660 |
| 8,121,358 B2 | 2/2012 | Weng |
| 8,200,025 B2 | 6/2012 | Woodbeck |
| 8,200,669 B1 | 6/2012 | Iampietro |
| 2001/0022621 A1 | 9/2001 | Squibbs |
| 2001/0056434 A1* | 12/2001 | Kaplan et al. .............. 707/104.1 |
| 2002/0000998 A1 | 1/2002 | Scott |
| 2002/0040375 A1* | 4/2002 | Simon et al. .................. 707/517 |
| 2002/0051262 A1 | 5/2002 | Nuttall |
| 2002/0107973 A1 | 8/2002 | Lennon |
| 2002/0109728 A1 | 8/2002 | Tiongson |
| 2002/0143762 A1 | 10/2002 | Boyd |
| 2003/0076322 A1 | 4/2003 | Ouzts |
| 2003/0084087 A1 | 5/2003 | Berry |
| 2004/0205633 A1 | 10/2004 | Martinez |
| 2004/0218894 A1 | 11/2004 | Harville |
| 2005/0063613 A1 | 3/2005 | Casey |
| 2005/0078174 A1 | 4/2005 | Casey |
| 2005/0091596 A1 | 4/2005 | Anthony |
| 2005/0091612 A1 | 4/2005 | Stabb |
| 2005/0108620 A1 | 5/2005 | Allyn |
| 2005/0206751 A1 | 9/2005 | Manico |
| 2005/0268279 A1 | 12/2005 | Paulsen |
| 2006/0044401 A1 | 3/2006 | Park |
| 2006/0066752 A1 | 3/2006 | Kelliher |
| 2006/0090359 A1 | 5/2006 | Bork |
| 2006/0114338 A1 | 6/2006 | Rothschild |
| 2006/0153460 A1* | 7/2006 | Kim et al. .................. 382/225 |
| 2006/0155761 A1 | 7/2006 | Van |
| 2006/0187317 A1 | 8/2006 | Montulli |
| 2006/0224993 A1 | 10/2006 | Wong |
| 2006/0251339 A1 | 11/2006 | Gokturk |
| 2007/0035551 A1 | 2/2007 | Ubillos |
| 2007/0058932 A1 | 3/2007 | Wafler |
| 2007/0098266 A1 | 5/2007 | Chiu |
| 2007/0112852 A1 | 5/2007 | Sorvari |
| 2007/0115373 A1 | 5/2007 | Gallagher |
| 2007/0127833 A1 | 6/2007 | Singh |
| 2007/0162298 A1* | 7/2007 | Melton et al. .................. 705/1 |
| 2007/0188626 A1 | 8/2007 | Squilla |
| 2007/0223878 A1 | 9/2007 | Abe |
| 2008/0037826 A1 | 2/2008 | Sundstrom |
| 2008/0046840 A1* | 2/2008 | Melton et al. .................. 715/825 |
| 2008/0086686 A1 | 4/2008 | Jing |
| 2008/0094420 A1* | 4/2008 | Geigel et al. .................. 345/660 |
| 2008/0104019 A1 | 5/2008 | Nath |
| 2008/0133938 A1* | 6/2008 | Kocher et al. .................. 713/193 |
| 2008/0137848 A1* | 6/2008 | Kocher et al. .................. 380/201 |
| 2008/0148152 A1 | 6/2008 | Blinnikka |
| 2008/0170781 A1 | 7/2008 | Woolgar |
| 2008/0174676 A1 | 7/2008 | Squilla |
| 2008/0219638 A1* | 9/2008 | Haot et al. .................. 386/68 |
| 2008/0304755 A1 | 12/2008 | Xiao |
| 2008/0304808 A1 | 12/2008 | Newell |
| 2008/0310688 A1 | 12/2008 | Goldberg |
| 2009/0031246 A1 | 1/2009 | Cowtan |
| 2009/0067815 A1 | 3/2009 | Tsutsui |
| 2009/0089315 A1* | 4/2009 | Lara et al. .................. 707/102 |
| 2009/0094518 A1* | 4/2009 | Lawther et al. .............. 715/716 |
| 2009/0135274 A1 | 5/2009 | Kim |
| 2009/0148068 A1 | 6/2009 | Woodbeck |
| 2009/0150930 A1* | 6/2009 | Sherwin et al. .................. 725/35 |
| 2009/0153492 A1 | 6/2009 | Popp |
| 2010/0066822 A1 | 3/2010 | Steinberg |
| 2011/0055284 A1 | 3/2011 | Wallace |
| 2011/0055749 A1 | 3/2011 | Wallace |
| 2011/0064317 A1 | 3/2011 | Ubillos |
| 2011/0196888 A1 | 8/2011 | Hanson |
| 2011/0200980 A1 | 8/2011 | Takahashi |
| 2011/0208732 A1* | 8/2011 | Melton et al. .................. 707/728 |
| 2011/0234613 A1 | 9/2011 | Hanson |
| 2011/0264923 A1* | 10/2011 | Kocher et al. .................. 713/189 |
| 2012/0096361 A1 | 4/2012 | Osten |
| 2013/0067347 A1* | 3/2013 | Herold .................. 715/741 |

FOREIGN PATENT DOCUMENTS

| | | |
|---|---|---|
| EP | 1283482 | 2/2003 |
| EP | 1566752 | 8/2005 |
| EP | 1729263 | 12/2006 |
| EP | 1796099 A1 | 6/2007 |
| JP | 9027937 | 1/1997 |
| JP | 2002259410 | 9/2002 |
| JP | 2008131330 | 6/2008 |
| JP | 2008146191 | 6/2008 |
| KR | 2009003550 | 1/2009 |
| WO | 0175646 | 10/2001 |
| WO | 2005001658 | 1/2005 |
| WO | 2005001714 | 1/2005 |
| WO | 2008079750 | 7/2008 |

OTHER PUBLICATIONS

Adelman, Kenneth and Gabrielle, 'California Coastal Records Project,' Photography and website, [online], Copyright 2002-2005 Kenneth & Gabrielle Adelman—Adelman@Adelman.com, retrieved Apr. 11, 2008, pp. 1-4.

Anonymous: 'Indexing and recall of capture events', Research Disclosure, Mason Publication, Hampshire, GB, vol. 422, No. 66, Jun. 1, 1999, XP007124469 ISSN: 0374-4353.

Arnaud, Maetz, Authorized Officer, European Patent Office, PCT International Application No. PCT/US2011/056887, filed Oct. 19, 2011, International Search Report, mailed Jan. 11, 2012, 12 pages.

Brian K. Smith et al., Inquiry with imagery: historical archive retrieval with digital cameras, Proeedings of the seventh ACM international conference on Multimedia (Part 1), p. 405-408, Oct. 3D-Nov. 5, 1999, Orlando, Florida, US.

Cato, 'Digital Camera with Global Positioning Satellite to Record Location with Image', IBM Technical Disclosure, Sep. 1, 1998.

Chinese Notification of the First Office Action (with English translation) for Application No. 200780051294.9 dated Feb. 6, 2012, 9 pages.

Hewagamage, K.P. et al., "Augmented Album: situation-dependent system for a personal digital video/image collection"; Multimedia and Expo, 2000. ICME 2000. 2000 IEEE International Conference on New York, NY, USA, Jul. 30-Aug. 2, 2000, Piscataway, NJ, USA, IEEE, US, vol. 1, Jul. 30, 2000, pp. 323-326.

International Search Report and Written Opinion received in corresponding PCT Application No. PCT/US2007/087660, dated Jul. 30, 2008.

(56) References Cited

OTHER PUBLICATIONS

International Search Report and Written Opinion received in corresponding PCT Application No. PCT/US2008/056656, dated Aug. 1, 2008.

Jang C: 'A Smart Clustering Management for Concurrent Digital Photos using EXIF Metadata', Graphics Application Lab, Pusan National University , Jan. 1, 2008, pp. 1-13, XP002619728, Retrieved from the Internet: URL:http://pearl.cs.pusan.ac.kr/~wiki/images/c/ca/PAP08003GRA.pdf [retrieved on Feb. 1, 2011].

Mallery, Sam, 'Apple's New Ilife'11,' Oct. 21, 2010, B & H Insights, retrieved from the Internet on Jul. 18, 2013: URL: http://www.bhphotovideo.com/insights/blogs/home-portable-entertainment/apples-new-ilife-11.html, 4 pages.

Naaman et al., Adventures in Space and Time: Browsing Personal Collections of Geo-Referenced Digital Photographs Technical Report. Stanford., 2004.

O'Hare et al., My digital photos: where and when?, ACM Multimedia 2005—13th ACM International Conference on Multimedia 2005, Nov. 6-12, 2005, Singapore.

Perez, Luis, 'iPhoto 09 Basics,' Aug. 9, 2009, Retrieved from the Internet on Jul. 18, 2013: URL: http://etc.usf.edu/te_mac/movies/pdf/iphoto09.pdf, 14 pages.

Sony GPS tracker for photographers, Aug. 2, 2006.

Toyama et al., Geographic location tags on digital images, Proceedings of the eleventh ACM international conference on Multimedia, Session: Managing images, pp. 156-166, 2003.

Vailaya, A., Figueiredo, M. A. T., Jain, A. K., and Zhang, H.-J. 2001, "Image Classification for Content-Based Indexing," IEEE Trans. Image Process, 10, 1 117-130.

First Examination Report received in AU Application No. 2011236107, dated Nov. 19, 2012.

Snavely et al., "Photo tourism: Exploring photo collections in 3-D," ACM Transactions on Graphics, vol. 25, pp. 835-846 (2006).

Viana, et al., "PhotoMap: From Location and Time to Context-Aware Photo Annotations," Journal of Location Based Services, vol. 2, Issue 3, 2008, pp. 211-235, published Jan. 27, 2009.

\* cited by examiner

GENERATING DIGITAL MEDIA PRESENTATION LAYOUTS DYNAMICALLY BASED ON IMAGE FEATURES

TECHNICAL FIELD

This specification describes managing digital media items, for example, based on features shared by the items.

BACKGROUND

Digital media items include digital representations of content, such as, images, music, video, documents, and the like. Such media can be stored in electronic format, for example, JPEG, AVI, PDF, and the like, and transferred electronically, for example, from one data storage device to another, through electronic mail, and the like. The media can be created in one of several ways. For example, digital video images are captured using digital recorders and cameras, digital documents are created by several techniques including using suitable computer software applications, scanning hard-copies of documents, and the like, and digital music is created using audio recorders. Managing a digital media item generally describes performing one or more operations on the media items including creating, storing, transferring, editing, presenting, and the like.

In some scenarios, presenting a digital media item includes creating a composite presentation using other media items. For example, multiple digital images can be collectively displayed on a slide, which can be included in a slide show of digital images.

SUMMARY

This specification describes technologies relating to generating digital media presentation layouts dynamically based on image features.

In general, one innovative aspect of the subject matter described here can be implemented as a computer-implemented method executing on a data processing apparatus. Multiple digital images are received. A feature associated with one or more digital images of the multiple digital images is associated by the data processing apparatus. The feature being associated with the digital image is based either on metadata associated with the digital image or content included in the digital image or both. A significance measure is associated with the one or more digital images based on the identified feature associated with the one or more digital images. A digital presentation of the one or more digital images is generated. The digital images are displayed in the digital presentation according to the significance measure associated with respective digital images.

This, and other aspects, can include one or more of the following features. The digital presentation can be represented as a digital book having multiple sequentially arranged digital sheets. One or more digital sheets of the multiple digital sheets can be configured to display one or more bounded regions of variable sizes. A digital image can be displayed within a corresponding bounded region. Generating the digital presentation can include automatically including the one or more digital images of the multiple digital images in a corresponding bounded region and displaying the bounded region in a digital sheet. The content included in a digital image can be analyzed. It can be determined that the analyzed image is important based on the analyzed content. A bounded region can be displayed in a digital sheet. A size of the bounded region can be substantially equal to a size of the digital sheet. The analyzed digital image can be displayed in the bounded region. The one or more digital images can be received in a sequence. Generating the digital presentation can include arranging the one or more digital images in multiple sequentially arranged digital sheets in a sequence different from the sequence in which the one or more digital images are received. Metadata associated with a digital image can include a time of capture of the digital image or a location of capture of the digital image or both. A higher significance measure can be associated with a first digital image relative to a second digital image based on the feature associated with the first digital image and the feature associated with the second digital image. The first digital image can be presented more prominently in the digital presentation relative to the second digital image. Presenting the first digital image more prominently relative to the second digital image can include presenting the first digital image in a bounded region that is larger than a bounded region in which the second digital image is presented. The feature can include a user rating associated with the digital image by a user viewing the digital image. The feature can include a duration for which a user has viewed the digital image. The feature can include a number of times a user has transmitted the digital image via electronic mail.

Another innovative aspect of the subject matter described here can be implemented as a computer-readable medium tangibly encoding computer software instructions executable by data processing apparatus to perform operations that include receiving multiple digital images, one or more of which are associated with a feature, obtaining metadata about the one or more digital images either by analyzing the one or more digital images or by receiving metadata from a source separate from the one or more digital images or both, analyzing either the obtained metadata or content included in the one or more digital images or both, forming two or more groups of digital images from among the one or more digital images, digital images in a group related by a feature associated with each digital image in the group, and automatically generating a digital presentation of the one or more digital images, wherein a group of digital images is displayed in a corresponding portion of the digital presentation separate from another group of digital images displayed in another corresponding portion of the digital presentation.

This, and other aspects, can include one or more of the following features. The obtained metadata associated with a digital image can include a time of capture of the digital image or a location of capture of the digital image or both. Analyzing the obtained metadata can include analyzing the location of capture of the one or more digital images. Forming two or more groups of digital images can include comparing locations of capture of the one or more digital images, identifying two or more digital images having corresponding locations of capture that are substantially near each other, including the identified two or more digital images in a formed group, and associating the corresponding locations of capture with the formed group. The two or more digital images in the formed group can be displayed in the portion of the digital representation. The operations can further include displaying a map in the portion, the map showing the corresponding locations. Analyzing the obtained metadata can include analyzing the time of capture of the one or more digital images. Forming two or more groups of digital images can include comparing times of capture of the one or more digital images, identifying two or more digital images having corresponding times of capture that are substantially near each other, and including the identified two or more digital images in a formed group. The obtained metadata can further include a geographic location of capture. The operations can further include identifying one or more geographic locations of capture at which the digital images in the formed group of digital images were captured, identifying a name of a location that collectively represents the one or more geographic locations, and displaying the name of the location in the portion, adjacent to one or more digital images in the formed group of digital images.

Another innovative aspect of the subject matter described here can be implemented as a system that includes a data processing apparatus, and a computer-readable medium tangibly encoding instructions executable by the data processing apparatus to perform operations including forming multiple groups of digital images from among digital images, digital images in a group related by a feature associated with each digital image in the group; for two or more groups of digital images of the multiple groups, associating significance measures with the digital images in a group of digital images based on the metadata associated with the respective digital images or the content of the respective digital images or both; and generating a digital presentation of the two or more groups of digital images, wherein the digital images in a group of digital images are displayed according to the significance measure associated with the respective digital images and wherein a group of digital images is displayed in a corresponding portion of the digital presentation separate from another group of digital images displayed in another corresponding portion of the digital representation.

This, and other aspects, can include one or more of the following features. The operations for forming the multiple groups of digital images can include identifying a first digital image that includes a group of faces, comparing each face in the group of faces to a face included in a second digital image in the multiple images, determining that the face is included in the group of faces based on the comparing, and including the first digital image and the second digital image in a formed group based on the determining. The operations for forming the multiple groups of digital images can include identifying a first location of capture of a first digital image, identifying a second location of capture of a second digital image, wherein the second location of capture is substantially near to the first location of capture, and including the identified first digital image and the identified second digital image in a formed group. The operations for forming the multiple groups of digital images can include identifying a first time of capture of a first digital image, identifying a second time of capture of a second digital image, wherein the second time of capture is substantially near to the first time of capture, and including the identified first digital image and the identified second digital image in a formed group. The digital images in the group of digital images can have metadata. The metadata can include ratings of the respective digital images. The operations for associating the significance measures with the digital images in the group of digital images includes analyzing metadata associated with the digital images in the group of digital images to determine the ratings associated with the respective analyzed digital images, and associating significance measures with the digital images, the significance measures being proportional to the ratings associated with the respective analyzed digital images. The operations can further include determining that a significance measure associated with a first digital image is greater than a significance measure associated with a second digital image, and displaying the first digital image more prominently in the digital presentation relative to the second digital image. Displaying the first digital image more prominently relative to the second digital image can include displaying the first digital image in a first bounded region, and displaying the second digital image in a second bounded region that is smaller than the first bounded region. The digital presentation can include multiple digital sheets. One or more digital sheets of the multiple digital sheets can be configured to display a digital image in a bounded region. Displaying the first digital image more prominently relative to the second digital image can include displaying only the first digital image in a bounded region on a first digital sheet, and displaying the second digital image in a bounded region adjacent to one or more other digital images on a second digital sheet. The operations for generating the digital presentation can include determining a theme for a group of images based on the feature that relates the digital images in the group and a history of themes, and applying the theme to a portion of the digital presentation in which the group of digital images are presented. Applying a theme to the digital presentation can include detecting a prominent color included in the content of the group of digital images, and displaying the group of digital images on a background color complimentary to the prominent color. The history of themes can be updated based on user input indicating changes to the applied theme. The feature that relates the digital images in the group can be a geographic location at or adjacent to which the digital images in the group were captured. The operations for generating the digital presentation can include displaying a caption in the digital presentation in the portion of the digital presentation in which the group of digital images are presented. The caption can include a name of the geographic location.

Particular implementations of the subject matter described in this specification can be implemented to realize one or more of the following potential advantages. Digital images can be grouped and presented in composite digital media presentations automatically, i.e., without user intervention or user input. The digital images can be grouped by intelligently identifying natural breaks in the digital images based on the content or metadata of the digital images. The layout of a digital media presentation can be enhanced by presenting the groups of images in a sequence that is more contextually relevant to the user than the sequence in which the digital images were captured. The significance of the digital images can be used to display more significant digital images more prominently, i.e., digital images determined to be more important to the user, based on metadata or content, can be presented in a larger region of a composite digital media presentation.

Further, digital images can be placed on different regions of a composite digital media presentation based on the significance of the digital images. Automatically generating composite digital media presentations can reduce the amount of time a user spends creating a composite digital media presentation, i.e., the time a user spends grouping, moving, and resizing digital images. In this manner, user experience can be enhanced. Further, a user can request to receive a hardcopy of a composite digital media presentation. Moreover, by intelligently grouping images and by automating the means by which the significance of an individual image is determined, the system can present images with minimal user involvement in a way that emphasizes certain images and overall improves the story being told through those images. In addition, the techniques can aid a user in locating special images and filter images from a group of images that are potentially less significant or of lesser interest in comparison to other images in the group. Furthermore, the burden on users of authoring content as composite digital media presentations can be decreased by enabling intelligent grouping and correlation of photos.

BRIEF DESCRIPTION OF THE DRAWINGS

Like reference numbers and designations in the various drawings indicate like elements.

DETAILED DESCRIPTION

Digital media items can be of different types and can be obtained using different devices. Each device can be configured to obtain an item of a particular type. Alternatively, a single device can be configured to obtain multiple items of multiple types. In some scenarios, the item can be obtained using a digital camera or a mobile communication device, for example, a personal digital assistant, a mobile device configured to capture images, play video, and the like. In some scenarios, items can be obtained using several devices, and all such obtained items can be transferred to a single computer system using which the items can be managed, for example, stored, transferred, edited for presenting, and the like.

Using techniques described later, either or both of metadata associated with and content included in digital media items, for example, digital images, are used to intelligently display one or more digital images in a digital media presentation. In some implementations, a system can receive a user request for a hardcopy of the digital media presentation. For example, a book in which selected digital images are arranged, can be made and provided to the user.

With reference to digital images, a digital media presentation includes two or more digital images selected from among multiple digital images. Digital images in a digital media presentation are displayed based on features associated with the digital images. For example, digital images with a common feature are displayed together in a group in the digital media presentation. In another example, significance measures for digital images are determined based on a feature associated with the digital images, and the digital images are displayed in the digital media presentation according to their significance measure. A significance measure is a representation of the importance of a digital image to a user, as described below with reference to FIG. 2. The digital media presentations can be formed by a system described with reference to FIG. 1.

Figure 1:
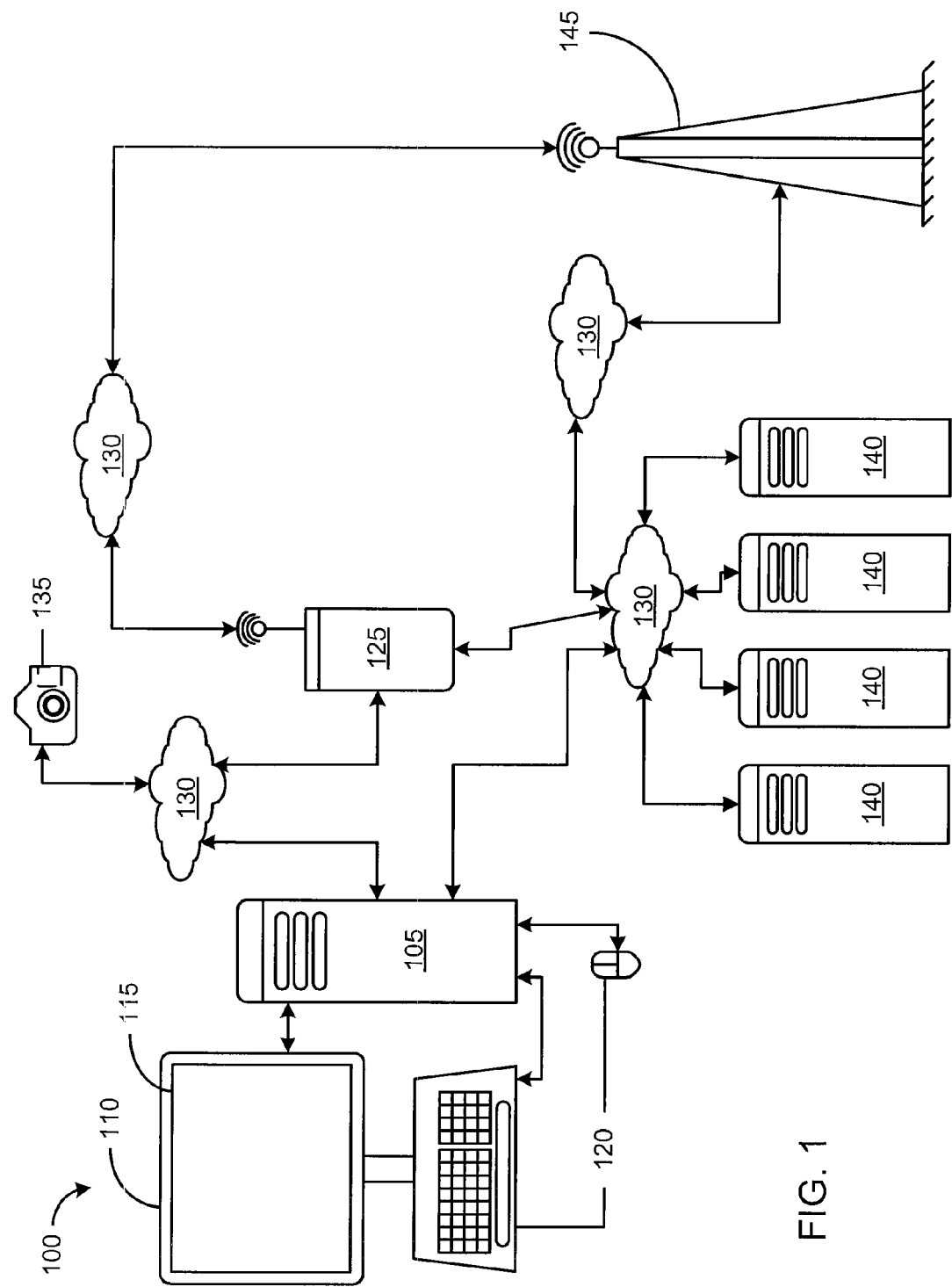
FIG. 1 shows an example system for managing digital media.

FIG. 1 shows an example system 100 for managing digital media. The system 100 includes a computer system 105, for example, a desktop computer, a laptop computer, and the like, that is operatively coupled to a display device 110, for example, a liquid crystal display (LCD) monitor. The computer system 105 is configured to execute computer software instructions, the outputs of which can be displayed in the display device 110, for example, in a user interface 115. The computer system 105 can be connected to one or more inputs 120, for example, a keyboard and a mouse. The inputs 120 can be used to provide feedback to applications presented in the user interface 115.

A mobile computing device 125 is coupled to the computer system 105 through a network 130. The mobile computing device 125 includes processing circuitry that is configured to execute computer software instructions, the outputs of which can be displayed on the display device 110. In some implementations, the mobile computing device 125 is configured to capture digital content that can subsequently be associated with digital images. In some implementations, the mobile computing device 125 is configured to capture both digital images and digital content. The following techniques, that describe displaying digital images in digital media presentations based on features, can be implemented using either the computer system 105 or the mobile computing device 125 or both. Techniques using which the computer system 105 can receive the digital images are described below.

The computer system 105 can receive digital media items from a user of the computer system 105. For example, the computer system 105 operatively couples with and receives digital images from devices, such as a digital camera 135. The user captures multiple digital images using the digital camera 135. Each of the digital images is stored in a data storage device, for example, a non-volatile memory card housed by the digital camera 135, a universal serial bus (USB) memory device, and the like. Subsequently, the user can transfer the captured digital images to the computer system 105 from the digital camera 135 over the networks 130. In this manner, the computer system 105 can receive digital images as data files from storage devices in response to the user's actions to transfer the images to the mobile computing device 125. Alternatively, or in addition, digital images can be transferred to the computer system 105 through electronic mail (e-mail), a wireless connection, or data networks, for example, the Internet.

Digital images include the pixel information representing the content of the digital image. The pixel information describes low-level features of each digital image that either can be obtained directly from the pixel information or can be derived from the pixel information. Such information includes edges, for example, sharp color gradient changes, locations of such changes, directional orientations, and the like. From such information, the presence of straight lines and corners in an image can be determined. The information additionally describes texture, i.e., the appearance of regular patterns in the image, colors, for example, regions of relatively similar color, color palette warmth, coolness, and the like. The computer system 105 can be trained on the low-level features to recognize mid-level features, for example, foliage, sunset, beach, human faces, buildings, areas of interest, dominate colors, and the like. To do so, the computer system 105 can implement machine learning classifiers in some implementations.

Additionally, digital images are associated with features that describe the image. Such features include image metadata that describes properties of an image, for example, a time of capture, a geographic location of capture, a description associated with the image either by the device using which the image was capture or by a user or both, and the like. In some situations, the digital camera 135, in addition to capturing a digital image, identifies and associates the metadata, for example, the time of capture, with the digital image. In some implementations, the captured image is stored as a data file that includes pixel information, i.e., image content. The time of capture, for example, a date and time, is stored as image metadata in the data file. The metadata also includes a data file name under which the digital image is stored, file properties such as file size, file type, properties of the device using which the image was captured, for example, camera focal length, aperture settings, and the like. Thus, each image captured by the digital camera 135 is associated with corresponding metadata.

In some implementations, the features of each digital image can also include information representing a corresponding geographic location of capture. For example, latitude/longitude/altitude information included in Global Positioning System (GPS) coordinates can be associated as metadata with each digital image data file to represent a location at which the image was captured. In some scenarios, a GPS device can be used to record the geographic location, for example, the GPS coordinates. The GPS coordinates recorded by the GPS device can be subsequently associated with the image. In some implementations, the digital camera 135 is configured to capture geographic location information along with the digital image. In such implementations, the GPS coordinates can be associated with the digital image automatically at the time of capture.

In some situations, the computer system 105 can be operatively coupled to data hosts 140 that store a database of GPS coordinates and a database of popular tourist destinations. The computer system 105 can determine that images taken by the digital camera 135 were captured at a location that is a popular tourist location. For example, the computer system 105 can send GPS coordinates associated with multiple digital images to the data hosts 140. The data hosts 140 can send location names to the computer system 105 in response to the GPS coordinates. The computer system 105 can store the location names in metadata associated with the multiple digital images. The computer system 105 is operatively coupled to the data hosts 140 over the networks 130, for example, the Internet, a Wi-Fi network, a cellular telephone network provided by a service provider 145, and the like.

The features can additionally include text associated with a digital image. The text can be received from a user managing the digital image and can be, for example, a data file name under which the user stores the image, a caption, such as text, that the user associates with the image, and the like. When receiving digital images, the computer system 105 can also receive the features that include either metadata or the content or both. In some implementations, the computer system 105 can receive the images and the features as data files with which the image information is associated as metadata.

Figure 2:
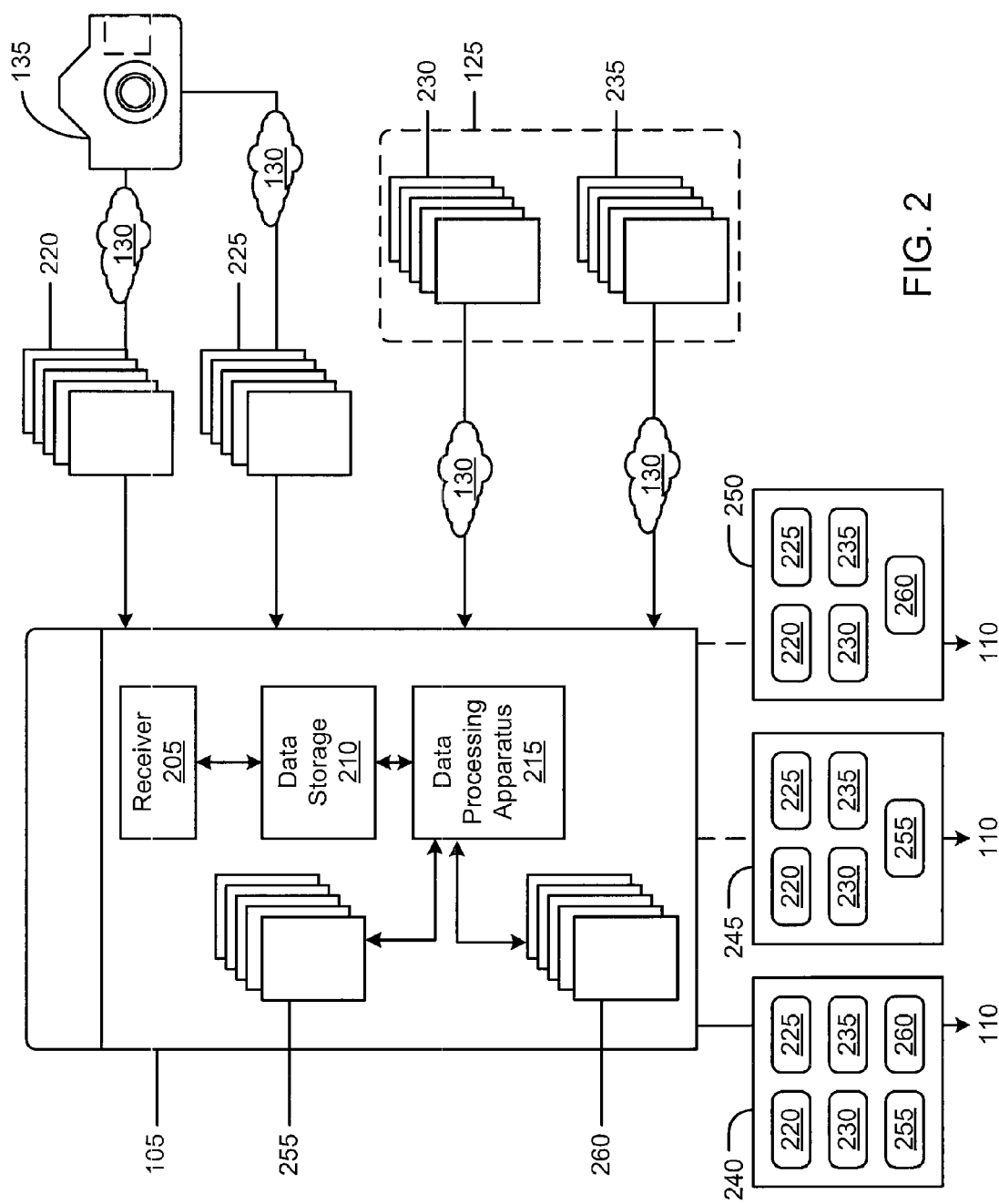
FIG. 2 shows an example computer system that exchanges information with multiple external devices.

FIG. 2 shows an example computer system 105 that exchanges information with multiple external devices. In some implementations, the computer system 105 includes a receiver 205 to receive digital images 220 and associated features 225 from the digital camera 135 through the networks 130. The receiver 205 can also receive digital images 230 and associated features 235 from the mobile computing device 125. For example, the mobile computing device 125 can be a GPS coordinates-capturing device that can transfer captured coordinate features 235 to the computer system 105. Subsequently, the digital images 220 can be associated with geographic location features 235 either automatically or responsive to input or both. The receiver 205 can receive the images and the features from additional devices configured to capture digital media items or features or both. The computer system 105 can include a data storage 210, for example, a hard disk or a solid state drive, to store the digital images 220, 230 and features 225, 235 received by the receiver 205.

The computer system 105 includes a data processing apparatus 215 configured to generate digital media presentations 240, 245, 250 of the digital images 220, 230 received by the receiver 205. For example, a composite digital media presentation can be a slide show that includes multiple slides, each showing multiple digital images. In another example, a composite digital media presentation can be a digital book that includes multiple digital page spreads. Each digital page spread can include two or more digital pages for presenting multiple images. For example, a digital spread that includes two digital pages includes a left digital page and a right digital page. One or more digital images can be presented on each of the digital pages. In some implementations, the digital images are included in corresponding bounded regions, and the bounded regions are presented on the digital pages. The width, height, rotation, and orientation of each of the bounded regions can be selected or adjusted based on the metadata of and content in the digital image included in the bounded region. Each digital page or digital page spread can include text relating to the images displayed on the digital page or digital page spread. The text can be automatically generated by the data processing apparatus 215 or entered by a user.

For example, metadata can include GPS coordinates corresponding to where a digital image was taken. The data processing apparatus 215 can determine a location of capture of the digital image by analyzing the metadata associated with the digital image. The apparatus 215 can determine a name of the location of capture using the location of capture of the digital image. For example, the apparatus 215 can request the name of the location of capture from the data hosts 140. The apparatus 215 can generate a digital media presentation and include the digital image on a digital page within the digital medial presentation. The apparatus 215 can automatically place a caption containing the name of the location of capture on the same digital page as the digital image. For example, the apparatus 215 can display the caption below the digital image without user input or user intervention.

The data processing apparatus 215 is configured to execute computer software instructions to perform operations to generate the composite digital media presentations 240, 245, 250 and display the digital images 220, 230 received by the computer system 105 in the digital media presentations 240, 245, 250. The apparatus 215 can generate the digital media presentations 240, 245, 250 automatically without user intervention or user input. The digital media presentations 240, 245, 250 can be presented to a user on the display device 110, for example, in the user interface 115.

For example, the data processing apparatus 215 receives multiple digital images from the data storage 210. The multiple digital images can be a subset of the digital images 220, 230, or the multiple digital images can include all of the digital images 220, 230. The apparatus 215 can receive input to present the multiple digital images, for example, from a user of the computer system 105. The apparatus 215 can generate a digital media presentation for displaying the multiple digital images. The apparatus 215 can automatically generate a presentation layout for the multiple digital images without receiving user input. The apparatus 215 can display the multiple digital images in the digital media presentation using the presentation layout. The display device 110 can present the digital media presentation as a digital book to the user. For example, the digital book can include a front cover, a back cover, a table of contents, chapters, and the like. The digital book can appear on the display device 110 as an electronic book.

In some implementations, the user can select an option to purchase a hardcopy of the digital book. The hardcopy can be a hardcover book, or a spiral-bound book, to name a few examples. After the user selects to purchase a hardcopy of the digital book, an electronic copy of the digital book can be sent to a publisher. For example, the computer system 105 can send an electronic file to a publisher (not shown). The publisher can create a hardcopy of the digital book by printing the digital images 220, 230 on paper pages representing the digital pages of the digital book. The digital images 220, 230 can be printed as the digital images 220, 230 were represented in the digital book, i.e., with the same size and orientation. The hardcopy of the digital book can be bound and sent to the user, for example, to the user's home address. In some implementations, the apparatus 215 can save an electronic copy of the digital media presentation on the data storage 210.

In some implementations, the digital images 220, 230 can be stored on a web server, for example, the data hosts 140. The web server can display a user interface, for example, in a web browser, to a user for uploading digital images to the web server and editing the digital images. Alternatively, the user can install an application on the computer system 105 that allows the user access to the digital images stored on the web server. The user can select two or more digital images for presentation in a digital media presentation. The web server can automatically create a layout for the two or more images to be displayed in the digital media presentation. Using the layout, the web server can display the two or more images in the digital media presentation and display the digital media presentation in the user interface 115. The user can edit the digital media presentation or save a copy of the digital media presentation to the web server or both. The user can request a hardcopy of the digital media presentation, for example, in the form of a photo album.

The data processing apparatus 215 can automatically group two or more of the digital images received by the receiver 205. The apparatus 215 can form clusters 255 that include logically grouped digital images from among the digital images received by the computer system 105. Digital images in a cluster are related to each other. For example, the related images share at least one common feature and are grouped based on the common feature. In some implementations, digital images can be included in more than one cluster. The clusters 255 are presented in the composite digital media presentations 240, 245 in which the digital images are presented, for example, displayed in the user interface 115. Each of the clusters 255 can be displayed on a separate digital page or separate digital page spread. The clusters 255 can be formed as described in U.S. application Ser. No. 12/891,252, entitled, "Grouping Digital Media Items Based on Shared Features," filed on Sep. 27, 2010, the entire contents of which are incorporated herein by reference.

For example, the receiver 205 can send the digital images 220 to the data processing apparatus 215 without storing the digital images 220 on the data storage 210. Upon receiving the digital images 220, the apparatus 215 can automatically group the digital images 220 into the clusters 255. The apparatus 215 can form the clusters 255 based on the events shown in the digital images 220. In some implementations, the apparatus 215 receives digital images from multiple sources, for example, from both the mobile computing device 125 and the digital camera 135. Each of the clusters 255 can include digital images from any number of the sources, for example,
from one or both of the mobile computing device 125 and the digital camera 135. In some implementations, sending the digital images 220 directly to the apparatus 215 indicates that the digital images 220 should be displayed in a digital media presentation. The apparatus 215 can determine a layout of the digital images 200 in a composite digital media presentation without receiving user input indicating the layout.

The data processing apparatus 215 can analyze the content included in the digital images 220 in order to determine features associated with the digital images 220. For example, the apparatus 215 can identify faces included in the digital images 220. A group of faces can be identified in a first digital image from the digital images 220. The first digital image can include, for example, the faces of four friends, Frank, Jessie, Jon, and Val. The apparatus 215 can compare the group of faces with other faces in the digital images 220, for example, with a face included in a second digital image. The apparatus 215 can determine that the face in the second digital image is the same as one of the faces in the group of faces. For example, the second digital image can be a portrait picture of Val. Based on the first digital image and the second digital image including a picture of Val, the apparatus 215 can automatically form a first cluster containing the first and the second digital images. The apparatus 215 can store the first cluster in the clusters 255. The first cluster can include additional digital images that contain one or more of the faces of the four friends.

Continuing the example, the data processing apparatus 215 can form a second cluster in a manner similar to the forming of the first cluster and store the second cluster in the clusters 255. In some implementations, the second cluster does not include any digital images that are included in the first cluster. The apparatus 215 can automatically generate a digital book, for example the digital media presentation 245, based on receiving the digital images 220 from the receiver 205. The automatic generation of the digital book by the apparatus 215 is performed without user input or user intervention at any stage of the generation. The apparatus 215 can display the first cluster on a first digital page spread in the digital media presentation 245 and the second cluster on a second digital page spread. The computer system 105 can display the digital media presentation 245 on the user interface 115. In some implementations, the apparatus 215 displays the first cluster on the digital media presentation 240 and the second cluster on the digital media presentation 245, such that each digital media presentation includes images from only one of the clusters 255.

In another example, the computer system 105 can receive the digital images 220 from the digital camera 135. The computer system 105 can form the clusters 255 based on analysis of colors in the digital images 220. The user interface 115 can display the clusters 255 to a user. The user can select one or more of the clusters 255 to be included in a digital media presentation and select a "display" button in the user interface. Based on the selection of the "display" button, the computer system 105 can automatically generate a digital media presentation including the selected one or more clusters and display the digital media presentation on the user interface 115. During the automatic generation of the digital media presentation, the computer system 105 can create a layout for the digital images 220 in the digital media presentation without receiving user input or user intervention at any time.

The data processing apparatus 215 can associate significance measures 260 to the digital images 220, 230. The data processing apparatus 215 can display the digital images 220, 230 in the digital media presentations 240, 250 according to the significance measures 260 associated with the digital images 220, 230. The data processing apparatus 215 associates the significance measures 260 and displays the digital images 220, 230 without any user input. The significance measures 260 can be associated with the digital images 220, 230 based on either or both of metadata associated with the digital images 220, 230, or content included in the digital images 220, 230. The significance measures 260 of the digital images 220, 230 can be proportionally related to the importance of the digital images 220, 230 to a user that captured the digital images 220, 230.

The data processing apparatus 215 can analyze the metadata associated with the digital images 220 to determine a feature associated with each of the digital images 220. The apparatus 215 can associate a significance measure to each of the digital images 220 where the significance measure is proportional to the feature associated with each of the digital images 220. The apparatus 215 can generate the digital media presentation 250 and display digital images with higher significance measures more prominently in the digital media presentation 250 than digital images with lower significance measures. The apparatus 215 automatically associates the significance measures 260 and automatically generates the digital media presentation 250 without user interaction at any time during the association and generation.

For example, the data storage 210 can send multiple digital images to the data processing apparatus 215. Each of the multiple digital images has metadata associated with the digital image. The apparatus 215 can automatically determine a feature for each of the multiple digital images, such as a number of times each digital image has been viewed, based on the metadata. A significance measure can be associated with each of the multiple digital images based on the determined feature. For example, the apparatus 215 can associate a higher significance measure to a digital image with one thousand or more views than a digital image with a dozen views. In another example, the apparatus 215 can determine that the user has associated a rating to a digital image (1-star to 5-star, with 1-star being least favored and 5-star being most favored). If the apparatus 215 determines that the user has associated a 1-star rating to the digital image, then the apparatus 215 can associate a low significance measure to the image. Alternatively, if the apparatus 215 determines that the user has associated a 5-star rating to the digital image, then the apparatus 215 can associate a high significance measure to the image. The apparatus 215 can receive input to present the multiple digital images. A digital media presentation can be generated automatically by the apparatus 215 and the multiple digital images can be displayed according to their significance measure without user input or user intervention during the generation.

Generally, the significance measure associated with an image can depend on an act performed on the image. Viewing the image a certain number of times is an example of an act. Associating a rating to the image is another act. The data processing apparatus 215 can determine that some acts are more significant than others. For example, the significance measure that the apparatus 215 associates with an image that a user views several times can be less than the measure that the apparatus 215 associates with the image that the user rated as being a 5-star image. Similarly, the significance measure that the apparatus 215 associates with an image that a user views very few times can be greater than the measure that the apparatus 215 associates with the image that the user rated as being a 1-star image. Thus, whereas the apparatus 215 can infer a significance measure to be associated with an image based on a number of views, the apparatus 215 can associate more concrete significance measures to the images when a user acts to rate the images. Other acts that can be performed on the images can include downloading the image to a storage device, transmitting the image (for example, through electronic mail), printing the image, uploading the image to a website, and the like. Thus, the apparatus 215 identifies each act performed on the image and associates a significance measure that collectively represents all the acts.

In some implementations, the significance measure that the data processing apparatus 215 associates can be any value in a range of −1 to +1. The outer boundaries indicate least significant (−1) and most significant (+1), with the mid-value (0) indicating a neutral measure. Alternatively, the inverse of these values can also be used as significance measures. To determine a collective significance measure based on the significance measures associated with each act performed on the image, the apparatus 215, in some implementations, can extrapolate the range from −1 to +1 to −100 to +100. From the extrapolated range, the apparatus 215 can determine a significance measure for an image that represents an importance of the image to the user based on all the acts that the user has performed. For example, if a user has assigned a 2-star rating to an image, has not viewed an image several times (i.e., less than a threshold number of times), and has not transmitted the image through electronic mail, then the apparatus 215 associates a significance measure in the range of −1 to +1 for each of these acts, extrapolates the measure to the −100 to +100 range, aggregates the individual significance measures, and determines a significance measure that collectively represents the importance of the image to the user.

An example of determining a significance measure is described below. For example, the apparatus 215 can implement an example formula that is based on establishing a desired scoring system of photo traits. The apparatus 215 can modify the scoring based on a confidence level with a relevance of a trait. For example, the apparatus 215 can consider only the following traits—image was viewed more than a threshold number of times, image was transmitted (for example, via electronic mail), a hard copy of the image was printed, 4-star rating was assigned to the image, image was edited, a description was attached to the image, the image includes faces with which names are associated—to determine the significance measure. It will be appreciated that the apparatus 215 can be configured to determine the measure based on additional (or fewer) traits or combinations of other traits.

The apparatus 215 can assign a weighted score for each trait, for example:
image was viewed more than a threshold number of times—0.75
image was transmitted—1.0
a hard copy of the image was printed—1.0
4-star rating was assigned to the image—0.5
image was edited—0.75
a description was attached to the image—0.75
the image includes faces with which names are associated—0.5.

In this manner, positive scores can be assigned to traits. Negative scores can also be assigned to certain other traits or when a certain trait is not applicable to an image or both. For example, if the apparatus 215 determines that an image was never viewed, then the apparatus 215 can assign a score of −1.0 for that trait. To determine the collective significance measure, the apparatus 215 can perform a summation of all the trait scores (for example, 2.75) and divide the sum by total possible score (for example, 5.25) to obtain a significance measure (for example, 0.524) for the image.

In some implementations, the data processing apparatus 215 generates a digital media presentation, such as the digital media presentation 250, for displaying the multiple digital images. The data processing apparatus 215 can dynamically generate a layout for the multiple digital images based on the significance measures of the multiple digital images. Both the layout generation and the placement of the multiple digital images in the layout are done automatically without user input during any step of the generating and placing. For example, digital images with a higher significance measure can be displayed more prominently in the layout of the digital media presentation. The digital media presentation can display the multiple digital images by descending significance measure. The digital image with the highest significance measure can be displayed on the first digital page of the digital media presentation; the digital image with the second highest significance measure can be displayed on the second digital page, and so on until the digital image with the lowest significance measure is displayed on the last digital page of the digital media presentation.

In another example, the digital media presentation 250 includes a front cover, a back cover, and ten digital page spreads. The data processing apparatus 215 can automatically display the ten digital images with the highest significance measures on the left digital pages of the digital page spreads in decreasing order, with one digital image on each left digital page. The remaining digital images can be clustered randomly on the right digital pages of the digital page spreads, where each right digital page displays more than one digital image.

Significance measures can be associated with digital images based on the features of the digital images. The computer system 105 or the data processing apparatus 215 can determine a feature or features for the significance measures without user input. For example, a digital image can contain metadata that indicates the digital image is a favorite image of the user. Favorite digital images can be associated with higher significance values and displayed more prominently than digital images that are not favorites. In another example, digital images containing landscapes can be displayed more prominently in digital media presentations based on significance measures associated with the landscape digital images. A landscape image is one that does not include a face or one in which a face (or faces) are insignificant, for example, are very small in size, have undetectable features, and the like In some implementations, the data processing apparatus 215 creates layouts for digital media presentations using both the clusters 255 and the significance measures 260 to display the digital images 220, 230 in a digital media presentation. In one example, one hundred digital images 220 are captured across five different geographical locations, for example, cities, using the digital camera 135. Geographical location features 235 for each of the cities are captured using the mobile computing device 125. The computer system 105 receives, stores, and analyzes the digital images 220 and the features 235 to form five clusters, each including digital images captured in a corresponding city. The computer system 105 can analyze the digital images 220 automatically upon receiving the digital images 220. In this example, each city represents a natural break in the capturing of digital images and serves as the feature based on which the digital images are grouped. Each of the five clusters can be associated with the name of the city in which the digital images in the cluster were taken.

Each of the digital images 220 include metadata, such as a user rating, a time of capture, a duration for which a user has viewed the digital image, or a number of times a user has emailed the digital image. The computer system 105 can automatically analyze the metadata associated with the digital images 220 in order to determine a feature associated with the digital images 220, for example, the user rating. The computer system 105 can associate significance measures with the digital images 220 based on the user ratings. For example, the significance measures for the digital images 220 are proportional to the user ratings associated with the digital images 220. In some implementations, the computer system 105 automatically associates significance measures with the five clusters. For example, the computer system 105 can associate a significance measure with each of the five clusters based on the times of capture of the digital images in the cluster.

Continuing the example, the computer system 105 receives input to present the five clusters and generates a digital media presentation containing the five clusters, such as the digital media presentation 240. The computer system 105 generates a layout for the digital media presentation 240 automatically without input or intervention from a user. Each cluster is displayed in a different section or chapter of the digital media presentation 240 from the other clusters. For example, the digital media presentation 240 can include a first chapter for a first cluster of digital images taken in a first city and a second chapter for a second cluster of digital images taken in a second city. The first chapter can be displayed in the digital media presentation 240 before the second chapter based the significance measures associated with the first and second clusters. For example, the significance measures of the five clusters are based on the times of capture of the digital images in each cluster and times of capture for the first cluster are before the times of capture for the second cluster.

The first chapter can include one digital page spread for displaying the digital images in the first cluster. The computer system 105 can present the digital images in the first cluster in the one digital page spread automatically based on the significance measures associated with the digital images in the first cluster. For example, a first digital image with the highest significance measure is presented on the left digital page of the digital page spread. A second digital image with the second highest significance measure is presented in the top half of the right digital page of the digital page spread, and the remaining digital images in the first cluster are presented below the second digital image. In some implementations, text associated with the first cluster can be automatically displayed on the digital page spread. For example, the name of the city the digital images in the first cluster were taken can be displayed toward the top of the digital page spread. The automatic presentation of the clusters, the digital images, and text associated with the clusters in the digital media presentation 240 is performed by the computer system 105 without user input or intervention at any time during the presentation. The computer system 105 can display the digital media presentation 240 in the user interface 115 for presentation of the digital media presentation 240 to a user.

In some situations, the computer system 105 can receive the digital images 220, 230 in a sequence. The computer system 105 can store the digital images 220, 230 in the data storage 210 in the sequence in which the images are received. The computer system 105 can automatically associate the significance measures 260 to the digital images 220, 230 and display the digital images 220, 230 in the digital media presentation 250 according to the significance measures 260. In this example, the significance measures 260 are not related to the sequence in which the digital images 220, 230 are received by the computer system 105.

The significance measures 260 can be associated with the digital images 220, 230 or the clusters 255 in a way that presentation of the digital images 220 will tell a story. For example, the significance measures 260 can be associated with the clusters 255 so that each cluster represents a single day of a vacation or a city visited during a business trip. The significance measures 260 can be associated based on date or the importance of the city to a user. For example, a cluster of digital images taken in a city, where the combined number of views of the digital images in the cluster is greater than the other clusters or the cluster contains more digital images than the other clusters, can have the highest significance measure, and so forth. The computer system 105 can automatically present the clusters 255 in a digital media presentation according to significance measure without user input. For example, a cluster with the most digital images can be presented in the digital media presentation before a cluster with fewer digital images. In this example, the digital media presentation can be a slide show used to present digital images from a trip that a user would otherwise have to create manually.

In some implementations, the clusters 255 of related digital images can be created based on times of capture of the digital images 220. Often, a user captures the digital images 220 over a period of time, for example, several days. Each of the digital images 220 is associated with metadata 225 including a time of capture. The user can transfer the digital images 220 to the computer system 105 using the network 130. The data processing apparatus 215 automatically forms multiple clusters 255, each including digital images that were captured in the same day. To do so, in some implementations, the data processing apparatus 215 identifies images associated with times of capture that fall within 24 hours from the beginning of each day, for example, beginning at 12:00 am (or any alternative reference time, either computer system specified or user specified), and groups the images to form clusters 255.

In some implementations, as the receiver 205 receives the digital images 220, the data processing apparatus 215 automatically analyzes the digital images 220 to identify the clusters 255 and associate the significance measures 260 to each digital image in a cluster. Upon analyzing the digital images 220, the data processing apparatus 215 can automatically create a section of a digital media presentation, for example, a chapter for a digital book, for each cluster. The data processing apparatus 215 automatically creates the sections without user input or user intervention. Each digital book can include multiple digital pages that display the digital images 220 in the cluster arranged in an order based on the significance measures associated with the digital images in the cluster. The data processing apparatus 215 can combine digital media presentation sections to create a digital media presentation in response to user input to create such presentations.

In one example, the data processing apparatus 215 can form a cluster of digital images that contain the same group of people. The cluster can include a group photo showing all of the people in the group and digital images of individual people from the group. The data processing apparatus 215 can display the cluster on a digital page spread in the digital media presentation 240. For example, the cluster can include a first digital image containing a group photo of five people, a second digital image containing images of a first and a third person from the group, and five digital images displaying single individuals from the group. The data processing apparatus 215 can associate the significance measures 260 to the seven digital images based on the number of people in the digital image. For example, digital images containing more people can be associated higher significance measures than digital images with fewer people.

Continuing the example, the first digital image has a higher significance measure than the second digital image because the first digital image includes the five people from the group and the second digital image contains two people from the group. Similarly, the second digital image has a higher significance measure than the five digital images displaying single individuals because the second digital image includes two people from the group. The data processing apparatus 215 can automatically display the first digital image more prominently in the digital media presentation 240 than the other six digital images because the first digital image is associated with a higher significance measure. For example, the first digital image can be displayed alone on a left digital page of the digital page spread and the remaining six digital images can be displayed together on a right digital page of the digital page spread. In some implementations, the second digital image is presented in a larger bounded region on the right digital page than the five digital images based on the higher significance measure associated with the second digital image.

In some implementations, a user can edit a digital media presentation after it has been automatically generated by the computer system 105. The user can make changes to the layout, the sizes, or the orientation of the digital images. Sections of the digital media presentation can be rearranged or deleted by the user. The user can select an option in the user interface 115 to re-generate the layout of the digital media presentation. For example, the computer system 105 can track the edits the user made to the digital media presentation, such as changes to font and background color. The computer system 105 can replicate the user changes throughout the digital media presentation when the computer system 105 re-generates the digital media presentation.

As described previously, the apparatus 215 can automatically generate a presentation layout for the multiple digital images. In some implementations, to do so, the apparatus 215 can select a layout from multiple presentation layouts stored, for example, in data storage 210. A presentation layout is a background against which one or multiple digital images are presented. A layout can be a background for a single digital image, for example, a portrait layout or a landscape layout within which a portrait image or a landscape image, respectively, can be displayed. Alternatively, the layout can be a background for multiple images. A presentation layout can include themes (for example, vacation theme, wedding theme, graduation party theme, and the like) with accompanying related text and images. For example, a layout having a birthday theme can include images of balloons that will be displayed along with digital images captured during the birthday party.

To automatically generate a presentation layout, the apparatus 215 can select one of the stored presentation layouts. The presentation layouts can be, for example, computer-readable digital images created by encoding computer program instructions that are executable by data processing apparatus. In some implementations, favorability scores can be associated with the multiple stored presentation layouts, such that the data processing apparatus 215 selects one of the stored presentation layouts based not only on the features in the digital images but also on the favorability score of the presentation layout in which the digital images will be displayed. For example, the designers who design the presentation layouts can associate a favorability score (in the range of −1 to +1) to each layout. The favorability score of a layout can be used, for example, to reduce an occurrence of layouts that are not favored in the digital presentation.

In some implementations, while generating a digital presentation, the data processing apparatus 215 can select one of the stored presentation layouts. After generating the presentation (for example, a digital page in a digital spread), the apparatus 215 can be configured to disfavor selection of the same layout for a future presentation, particularly if the selected presentation is associated with a low favorability score. Thus, in one example, the apparatus 215 can be configured to not select the same presentation for a certain number of digital presentations (for example, 20 presentations). Generally, the apparatus 215 can be configured to select presentation layouts with high favorability scores. However, in some scenarios, the cluster of digital images can be such that only the layout with the low favorability score is an appropriate background for the particular cluster. In such scenarios, the apparatus 215 will select the layout with the low favorability score.

In some implementations, the apparatus 215 can be configured to exclude all presentation layouts that have a negative favorability score (i.e., less than 0) and to select frequently from presentation layouts that have a neutral or positive favorability score (i.e., 0 to 1). Within the neutral or positive favorability score range, the apparatus 215 can be configured to select layouts having a favorability score of greater than or equal to 0.5 more frequently than layouts having a favorability score of less than 0.5. By doing so, the resulting digital presentations retain a rhythm of a theme of the presentation and also the intent of the designers of the presentations. In addition, the digital presentation has the appearance of telling a story rather than appearing as a sequence of random layouts.

Figure 3:
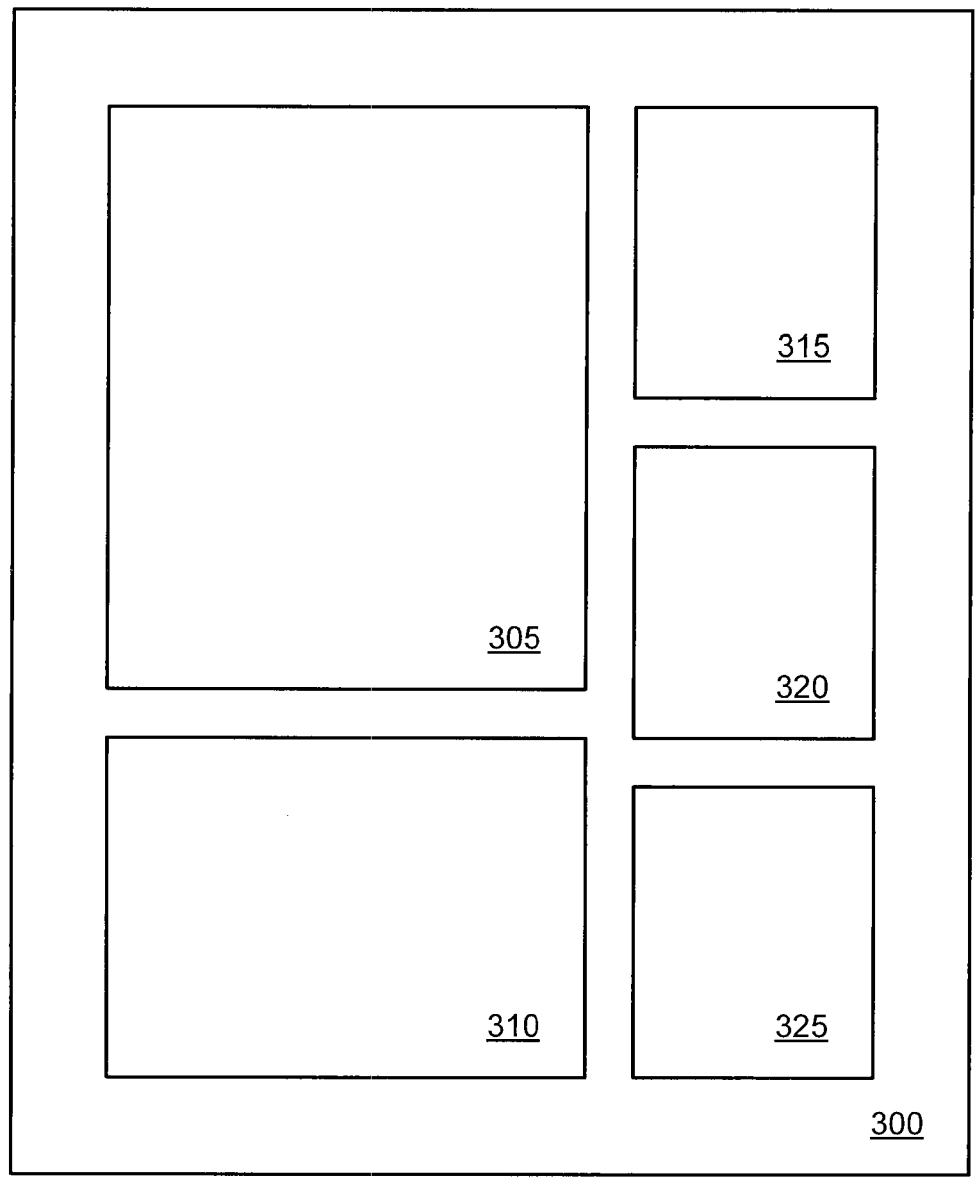
FIG. 3 shows an example digital page including multiple bounded regions.

FIG. 3 shows an example digital page 300 including multiple bounded regions. The digital page 300 can be used to present the digital images 230 in the digital media presentations 240, 245, 250. The digital media presentations 240, 245, 250 can include multiple digital pages or sheets similar to the digital page 300. The data processing apparatus 215 can create a cluster from the digital images 230 and present the images in the cluster in bounded regions 305, 310, 315, 320, and 325 on the digital page 300. The size, shape, placement and orientation of bounded regions can be variable and determined based on the significance measure of the digital images presented in the bounded regions. The data processing apparatus 215 can automatically create and place digital images on the digital page 300 without user input or user intervention during the creation and placement.

For example, metadata associated with the digital images 230 includes a location of capture for each of the digital images 230. The location of capture can be associated with the digital images 230 based on the features 235 or user input. The data processing apparatus 215 analyzes the metadata associated with the digital images 230 to determine the locations of capture of the digital images 230. The data processing apparatus 215 can identify five digital images that have locations of capture that are substantially near to each other, for example, the five digital images were taken in the same city. The data processing apparatus 215 can determine that the locations of capture of the five digital images are substantially near to each other based on the distance between the locations of capture. For example, the five digital images were taken within a one mile radius of each other.

In other implementations, the data processing apparatus 215 can query a map database with the latitude/longitude coordinates of the locations of capture for the five digital images. The map database can return the names of the locations of capture to the data processing apparatus 215. The data processing apparatus 215 can determine that the locations of capture are substantially near to each other based on the map database returning the same location name, for example, the same city name, for each of the five digital images. The data processing apparatus 215 can automatically associate the city name with the cluster in order to label the cluster.

Continuing the example, the data processing apparatus 215 can automatically display the five digital images in the bounded regions 305, 310, 315, 320, and 325 on the digital page 300. The bounded regions 305, 315, 320, and 325 display portrait digital images, and the bounded region 310 displays a landscape digital image. The five digital images can be presented in the digital page 300 in any order, for example, in a random order.

In some implementations, the data processing apparatus 215 can analyze either or both of the metadata associated with or the content included in the five digital images to determine the layout of the five digital images in the digital page 300. For example, the data processing apparatus 215 can determine that a first digital image has a user rating of five stars, a second digital image has a user rating of four stars, and a third, fourth, and fifth digital image have a user rating of two stars. The data processing apparatus 215 can associate significance measures to the five digital images corresponding to the user ratings of the five digital images.

Continuing the example, the data processing apparatus 215 automatically displays digital images with higher significance measures more prominently than digital images with lower significance measures without receiving indication from a user. The data processing apparatus 215 can display the first digital image in the bounded region 305. The second digital image can be displayed in the bounded region 310 on the digital page 300. The bounded region 305 is larger than the bounded region 310 because the first digital image has a higher significance measure than the second digital image. The data processing apparatus 215 can adjust or determine the width, height, and placement of bounded regions automatically based on the significance measure associated the digital image presented in the bounded region. The data processing apparatus 215 can display the third, fourth and fifth digital images in the bounded regions 315, 320, and 325 respectively.

Alternatively, since the third, fourth and fifth digital images have the same significance measure based on content, the data processing apparatus 215 can analyze the number of views associated with the third, fourth, and fifth digital images and update the significance measures. For example, when the data processing apparatus 215 associates the same significance measure to two or more digital images in a cluster based on a feature of the digital images, the data processing apparatus 215 can automatically analyze another feature of the digital images in order to update the significance measures. The data processing apparatus 215 can determine that the third digital image was viewed ten times, the fourth digital image was viewed forty-three times, and the fifth digital image was viewed twenty-two times. The data processing apparatus 215 can update the significance measures associated with the third, fourth and fifth digital images by a value proportional to the number of views of the digital images. In this example, the data processing apparatus 215 displays the fourth digital image in the bounded region 315, the fifth digital image in the bounded region 320, and third digital image in the bounded region 325.

Figure 4:
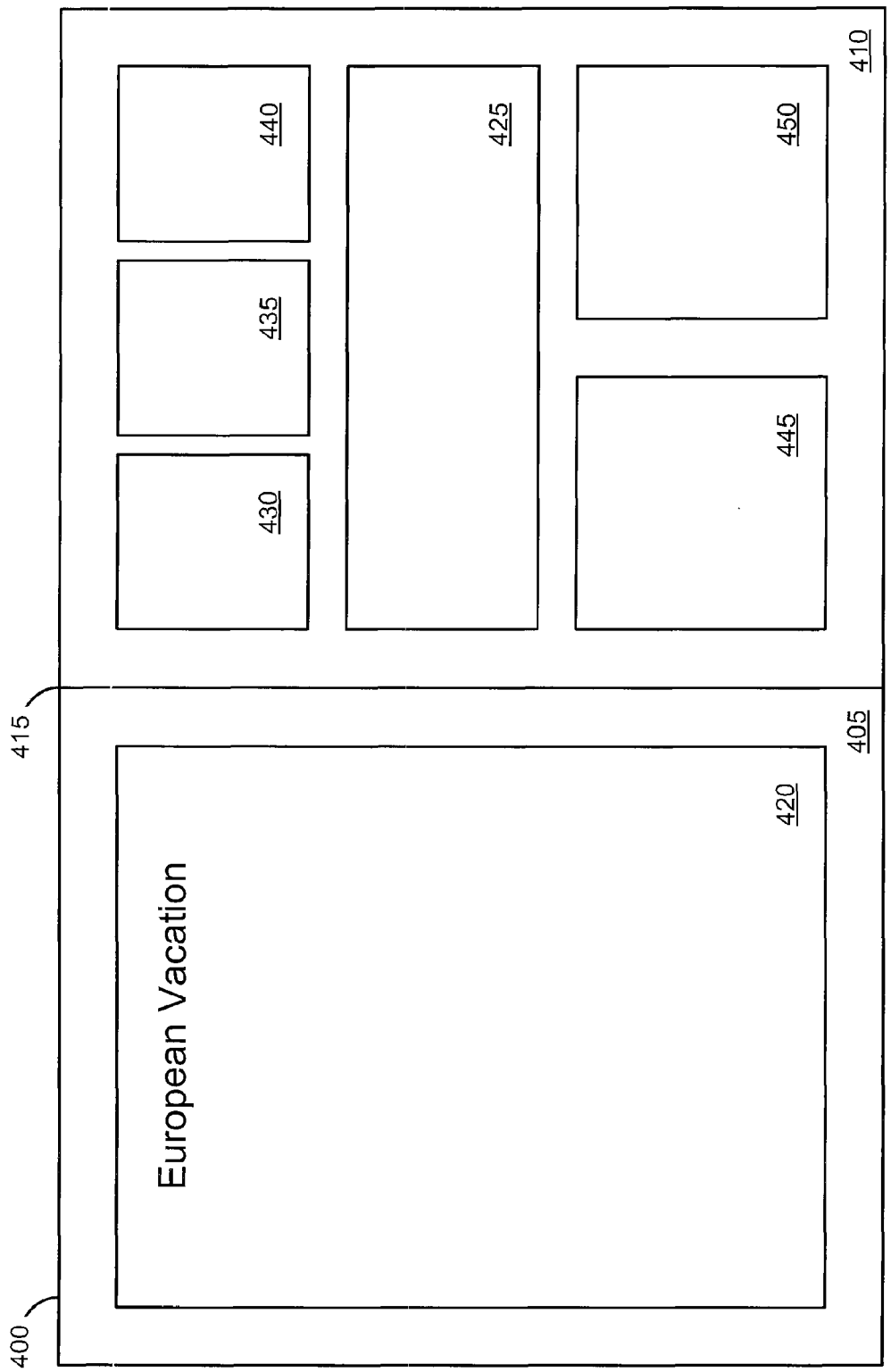
FIG. 4 shows an example digital page spread displaying two digital pages.

FIG. 4 shows an example digital page spread 400 displaying two digital pages. The digital page spread 400 includes a left digital page 405 and a right digital page 410 separated by a gutter 415. Each digital page 405, 410 can be, for example, the digital page 300 and display multiple digital images. The digital media presentations 240, 245, 250 can include one or more page spreads, similar to the digital page spread 400. Alternatively, the digital media presentations 240, 245, 250 can include digital page spreads that contain three or more digital pages or a combination thereof. The computer system 105 can determine the number of pages in a page spread automatically without receiving input from a user. The digital page spread 400 can be a page spread in a digital book. The gutter 415 can represent the location in the digital book that the left digital page 405 and the right digital page 410 are bound to the digital book if the digital book were printed to hardcopy.

The layout of the left digital page 405 can include a single bounded region 420. The layout of the right digital page 410 can include six bounded regions, such as a landscape oriented bounded region 425, three portrait oriented bounded regions 430, 435, 440, and two square bounded regions 445, 450. The computer system 105 can generate bounded regions with either a portrait or a landscape orientation for presentation of digital images in a digital media presentation. The computer system 105 can generate the layout for the left digital page 405 and the right digital page 410 automatically after detecting input to display multiple digital images in a digital media presentation.

For example, the computer system 105 can automatically analyze metadata associated with the digital images 220, 230 and forms the clusters 255. Each of the digital images 220, 230 can be associated with at least one cluster 255. The computer system 105 can analyze the metadata associated with digital images in each of the clusters 255 and automatically associate the significance measures 260 to the digital images 220, 230. The computer system 105 can receive input, for example, from one of the inputs 120, indicating that the digital images 220, 230 should be presented in the digital media presentation 240. In some implementations, a graphical user interface receives selection of the digital images 220, 230 and selection of a generate presentation button.

Each of the clusters 255 can be displayed on a page spread. For example, a first cluster is displayed on the page spread 400. In some implementations, each of the clusters 255 is displayed on more than one page spread, for example, a single cluster is displayed across three page spreads. The computer system 105 can determine a layout for the digital images in the first cluster based on the significance measures 260. For example, the computer system 105 can automatically associate significance measures with the digital images in the first cluster corresponding to the total duration each digital image has been viewed. Automatic association of the significance measures with the digital images can be performed by the computer system 105 without user input or user intervention. The computer system 105 determines that a first digital image has the highest significance measure in the cluster and displays the first digital image in the bounded region 420. The computer system 105 can determine that a second digital image is associated with the second highest significance measure. The computer system 105 can display the second digital image in the bounded region 425 in a landscape orientation. The computer system 105 can display the remaining digital images in the cluster in the bounded regions 430, 435, 440, 445 and 450 by descending significance measure.

In some implementations, the computer system 105 automatically adjusts the shape or orientation of the bounded regions based on content included in a digital image. For example, a third digital image includes a portrait image of a person. The computer system 105 can change the shape of the bounded region 435 to an oval with the long radius presented vertically parallel to the gutter 415 and display the third digital image in the bounded region 435. In other implementations, the computer system 105 generates the right digital page 410 initially with the bounded region 435 having an oval shape based on the content of the third digital image.

The computer system 105 can automatically determine the number of digital images to present on the left digital page 405 and the right digital page 410 based on the significance measures associated with a cluster to be presented in the digital page spread 400. For example, the computer system 105 can present a cluster with six digital images on the digital page spread 400. The cluster can include two digital images with the same significance measure, and the computer system 105 can present the two digital images on the left digital page 405. The remaining four digital images can be presented on the right digital page 410. Alternatively, the computer system 105 can present one of the two digital images on the top of the left digital page 405 with two of the remaining four digital images on the bottom of the page. The other digital image with the same significance measure can be presented on the bottom of the right digital page 410 with the last two digital images top of the page.

In some implementations, the computer system 105 can automatically display text on the digital page spread 400 that describes digital images in the digital page spread 400. The text can be determined based on metadata associated with the digital images in the digital page spread 400. For example, the file names or captions of the digital images can be analyzed by the computer system 105. The computer system 105 can determine similarities in the text associated with the digital images, such as text describing the event or location associated with the digital images. An introduction describing the digital images or a title can be automatically generated by the computer system 105 and displayed on the digital page spread 400, such as a title "European Vacation" on the left digital page 405. In some implementations, the computer system 105 can extract name information from metadata associated with digital images and display the names below the digital images. For example, the names can be of people or places depicted in the digital images.

The computer system 105 can automatically determine a theme for the digital page spread 400 based on the cluster displayed on the digital page spread 400. The theme can be based on the features 225, 235 associated with the digital images in the cluster, such as the color palette of the digital images, locations of capture, and the like. For example, the computer system 105 can analyze the content of the digital images and determine a prominent color in the digital images in the digital pages spread 400. The computer system 105 can determine a complimentary color to the prominent color and display the complimentary color as a background color on the digital page spread 400. For example, the computer system 105 can determine that the digital images displayed on the digital page spread 400 are black and white images. The computer system 105 can present a white background on the digital page spread 400. In another example, the computer system 105 can determine that the prominent color of the digital images displayed on the digital page spread 400 is blue. The computer system 105 can apply a theme with a green background to the digital page spread 400.

In some implementations, the computer system 105 can automatically determine that the digital page spread 400 includes two prominent colors, a first prominent color in the digital images on the left digital page 405 and a second prominent color in the digital images on the right digital page 410. The computer system 105 can analyze the two prominent colors and determine two complimentary colors, a first complimentary color for the left digital page 405 and a second complimentary color for the right digital page 410. Additionally, the first complimentary color can also be, for example, complimentary to the second complimentary color.

The data processing apparatus 215 can determine the rotation and orientation of digital images based the theme of the digital page spread 400. The rotation of a digital image is the degree that a bounded region containing the digital image is rotated around the axis through the center of the bounded region. For example, if the data processing apparatus 215 applies an abstract theme to the digital page spread 400, some or all of the digital images displayed on the digital page spread 400 can be rotated 42.5°.

In some implementations, the computer system 105 can analyze metadata associated with the cluster presented on the digital page spread 400 to automatically determine a theme without interaction from a user. For example, the computer system 105 can determine that the cluster was captured at a popular tourist destination. The computer system 105 can automatically create a composite digital media presentation that includes a title for the digital page spread 400 displaying the name of or text referring to the identified tourist destination. For example, the computer system 105 infers that a user is vacationing at the popular tourist destination, and automatically includes a caption displaying the text "Vacation" on the left digital page 405. The caption can be displayed as an overlay on top of the bounded region 420, or in a region of the left digital page 405 outside of the bounded region 420, for example, above the bounded region 420. In another example, the computer system 105 determines that the digital images displayed in a digital media presentation were taken in different locations across Europe, for example, each cluster in the digital media presentation was taken at a different location. The computer system 105 can automatically apply a "European" theme to the digital media presentation and include a title page or page spread at the beginning of the digital media presentation that includes the text "European Vacation" in the title.

Continuing the example, a first digital page for each cluster presented in the digital media presentation can include the title of the section, such as the name of the location visited. For example, a section containing pictures from Munich and Berlin can include the title "Photos from Germany." In some implementations, each section containing a cluster can have a different theme or a different variation on a theme corresponding to the digital images in the section.

In some implementations, the computer system 105 automatically applies a theme to the digital media presentation that is appropriate to the popular tourist destination. For example, the computer system 105 determines that digital images captured on a beach in Hawaii might be presented in a photo album with a default "Tropical" theme that includes art embellishments representing items that might be found on a beach. In another example, the computer system 105 automatically presents another group of digital images captured at a popular ski resort during winter months with a "Winter" theme. The computer system 105 or the data processing apparatus 215 can apply a theme automatically without input or intervention from a user.

In some implementations, themes can include one or more maps showing locations of capture for the images displayed in the theme. For example, a theme can include a map of Asia with markers on the map indicating the cities visited during a trip. A digital page at the front of a digital media presentation can include the title "Asian Vacation" along with the map indicating all of the cities visited. The sections of the digital media presentation can include a map indicating the specific location or locations that the digital images in the section were taken at. The sequence of section maps can depict the travel from city to city during the trip. For example, if a user traveled from Hong Kong to Tokyo, a first section in the digital media presentation can automatically include a first map of Asia with a marker on Hong Kong and a second section immediately following the first section can include a second map of Asia with a marker on Tokyo. Alternatively, the digital page spread 400 can include a map in the bounded region 420 with markers indicating the locations of capture of digital images presented on the right digital page 410.

The data processing apparatus 215 can store commonly used themes in the data storage 210. In some implementations, the data processing apparatus 215 stores a history of user changes made to themes. The history of changes can be used during generation of themes for digital media presentations in order to create themes personalized for a user. A user can select to upload common themes or changes to themes to a web server, for example the data hosts 140. After the user has uploaded themes to the web server, the user can download the themes onto another computer system for generation of digital media presentations on the other computer system.

In some situations, the user can associate text with a digital image, for example, a caption, a file name, and the like. More specifically, the user can associate significant text, for example, long lines of text, to some digital images that the user considers important and relatively insignificant or no text to less important digital images. The computer system 105 can automatically form a cluster based on the text associated with the digital images. Significance measures can be associated with the digital images based on the text associated with the digital images. The computer system 105 can associate a higher significance measure to a digital image with significant text and a lower significance measure to a digital image with very little text. When presenting the digital images in the cluster on the digital page spread 400, the computer system 105 can automatically display the text associated with each digital image along with the digital image, for example, as an image overlay. The text can be displayed as a caption, a title, or a summary of one or more digital images automatically by the computer system 105 without user indication. In some implementations, the computer system 105 displays significant text as captions for the associated digital images, and does not display captions for digital images associated with relatively insignificant text.

Figure 5:
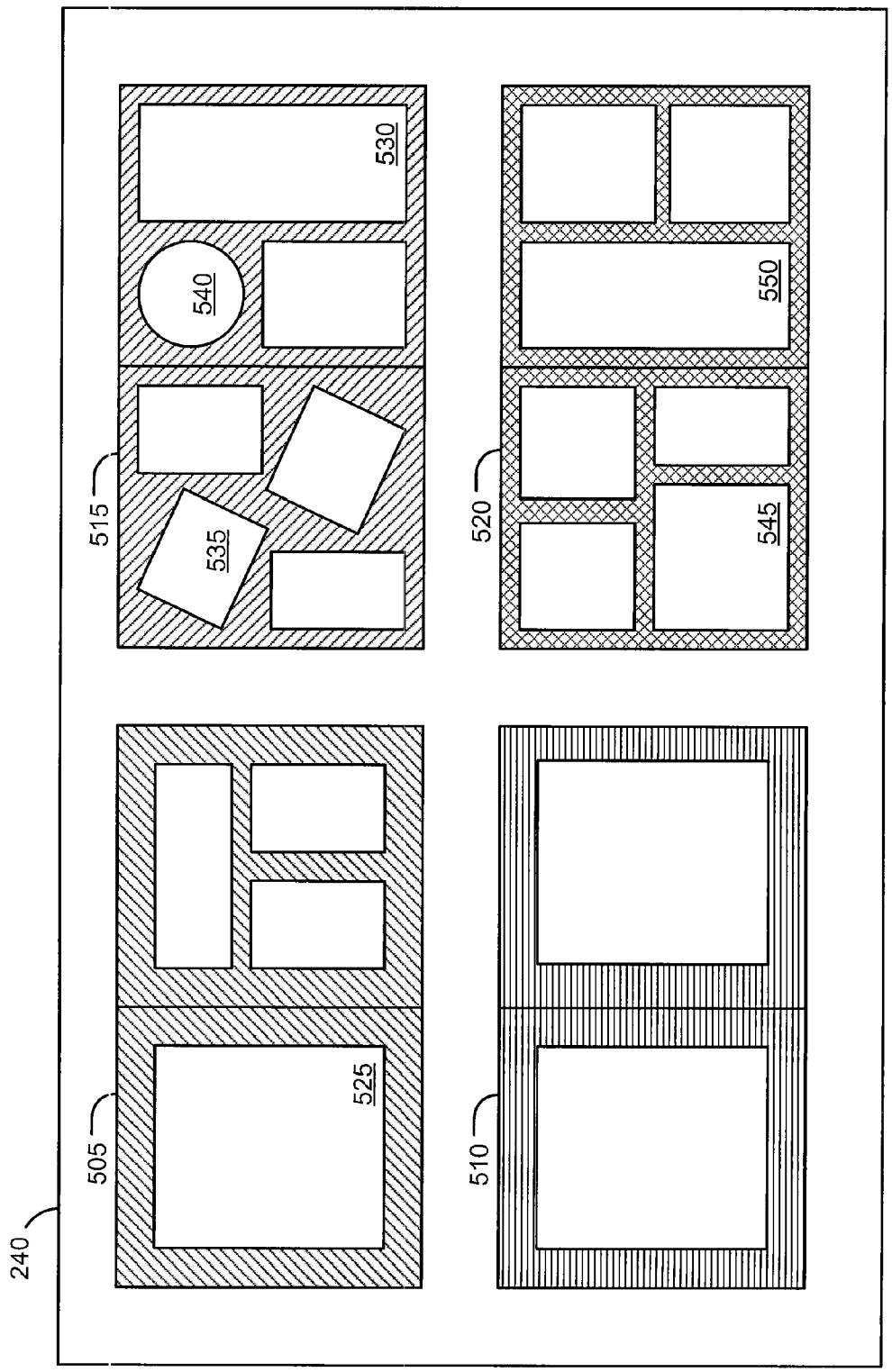
FIG. 5 shows an example digital media presentation with multiple digital page spreads.

FIG. 5 shows an example digital media presentation 240 with multiple digital page spreads. The data processing apparatus 215 can present the clusters 255 in the digital media presentation 240. A first cluster is displayed in a first digital page spread 505, a second cluster is displayed in a second and third digital page spread 510, 515, and a third cluster is displayed in a fourth digital page spread 520. In other implementations, the digital media presentation 240 can include any number of digital page spreads and display any number of clusters in the page spreads. The digital media presentation 240 can be a digital book, and the digital page spreads can represent the page spread of a book if the digital book were printed to hard copy.

For example, the data processing apparatus 215 can automatically create the clusters 255 based on faces included in the digital images 220, 230 taken by a user. The significance measures 260 can automatically be associated with each of the digital images in a cluster based on the number of times the user has viewed each of the digital images or the number of time the user sent each of the digital images as an email attachment. For example, the data processing apparatus 215 can associate a significance measure with each of the digital images proportional to the number of times the user viewed the digital image.

Each of the first cluster, the second cluster, and the third cluster can be formed and associated with significance measures by the data processing apparatus 215 as described above. The first cluster can be presented in the digital page spread 505 automatically according to the significance measures associated with the digital images in the first cluster. A first digital image in the first cluster is determined to have a higher significance measure than the other digital images in the first cluster and is presented in a bounded region 525. The data processing apparatus 215 can determine that a second digital image includes a caption and automatically display the caption below the second digital image on a right digital page of the digital page spread 505. The data processing apparatus 215 can generate the page spreads in the digital media presentation 240 automatically without user input or indication during any time of the generation.

The data processing apparatus 215 can automatically determine that the second cluster should be displayed across the second digital page spread 510 and the third digital page spread 515. This determination can be based on the number of digital images in the second cluster, content included in the second cluster, or significance measures associated with the second cluster.

The data processing apparatus 215 can display the digital images with the highest significance measures on the digital page spread 510. Alternatively, the data processing apparatus can display the digital image from the second cluster with the highest significance measure in the bounded region 530 on the third digital page spread 515, and the digital images with the second and third highest significance measures on the digital page spread 510.

In some implementations, bounded regions in a digital page spread can be rotated automatically such that the edges of the bounded region are not parallel to the edges of the digital page spread. For example, bounded region 535 has four edges, none of which are parallel to the edges of the digital page spread 515 containing the bounded region 535. Digital images taken at an angle, for example, can be presented in the bounded region 535. The data processing apparatus 215 can determine the orientation and rotation of a digital image automatically based on content included in the digital image or metadata associated with the digital image. For example, the metadata can include the degree of rotation that the digital image was taken at.

The data processing apparatus 215 can analyze the content of a digital image to automatically determine the shape of a bounded region to display the digital image in. For example, the data processing apparatus 215 can determine that a circular bounded region 540 for a digital image would enhance the presentation of the digital image.

In some implementations, the data processing apparatus 215 determines digital page spread layouts based on user modifications to automatically generated page spread layouts. The data processing apparatus 215 can track user preferences in the data storage 210 and use the preferences during automatic generation of digital media presentations, for both the layout and the theme of the digital media presentation. The user preferences can include settings specified by a user and preferences inferred by the data processing apparatus 215 based on changes made to digital media presentations by the user in the past. For example, user changes to bounded regions, such as size, orientation, or shape, can be used in determining layouts for the digital media presentation 240.

The data processing apparatus 215 can display the third cluster in the digital page spread 520. A first digital image with the highest significance measure in the third cluster can be displayed in a bounded region 545. A second digital image with the second highest significance measure can be displayed in a bounded region 550. In this example, the bounded region 550 is larger than the bounded region 545. However, the first digital image is displayed more prominently than the second digital image because the first digital image is displayed in the largest bounded region of a left digital page in the digital page spread 520.

Figure 6:
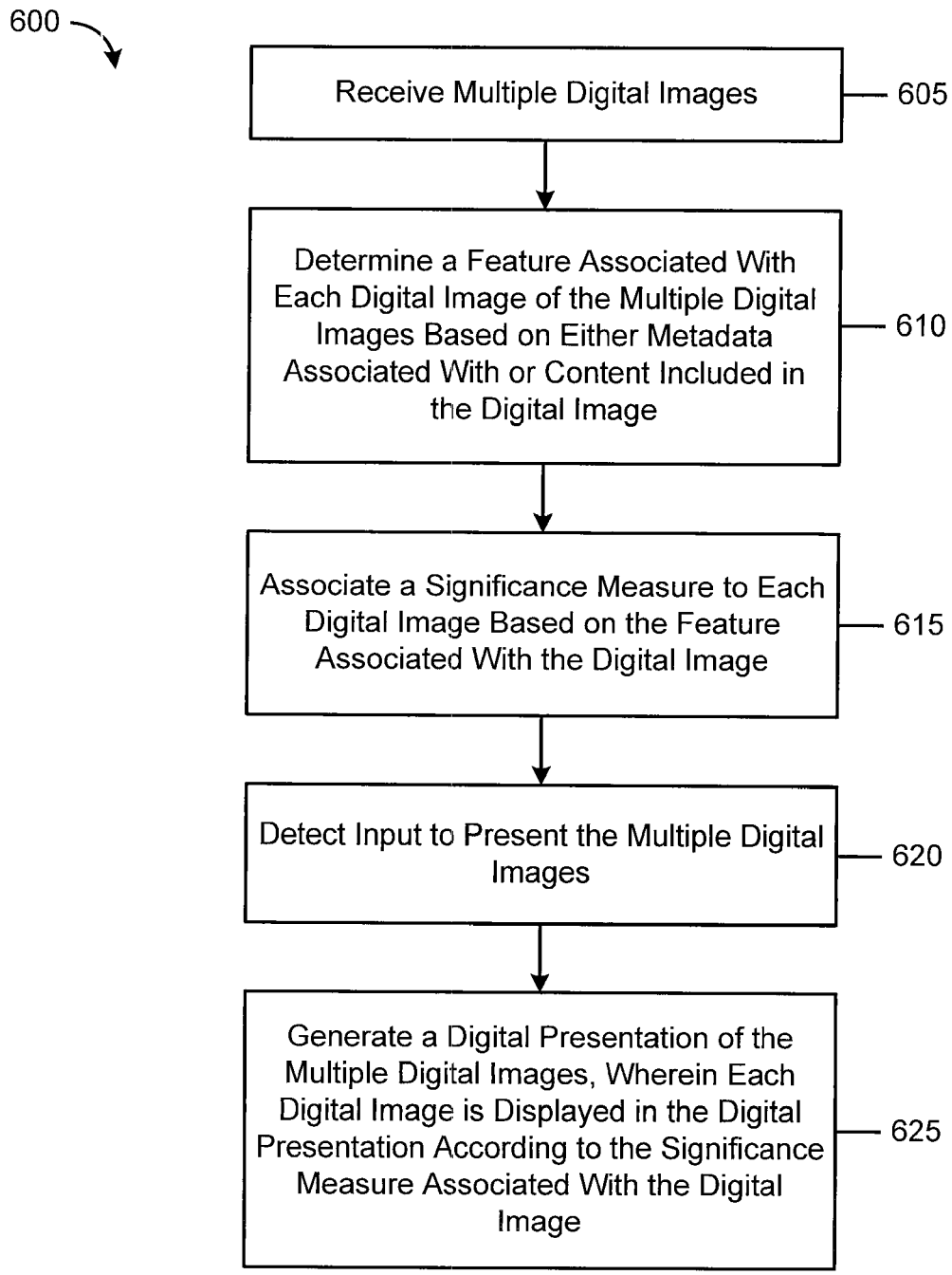
FIG. 6 shows a flowchart of an example process for generating a digital presentation and displaying digital images according to significance measures.

FIG. 6 shows a flowchart of an example process 600 for generating a digital presentation and displaying digital images according to significance measures. The process 600 can be implemented in a data processing system by computer software that performs the operations of the process, for example, a system like the computer system 105. The process 600 receives multiple digital images at 605. The process 600 determines a feature associated with each digital image of the multiple digital images based on either metadata associated with the digital image or content included in the digital image, or both, at 610. The process 600 associates a significance measure to each digital image based on the feature associated with the digital image at 615. The process 600 detects input to present the multiple digital images at 620. The process 600 generates a digital presentation of the multiple digital images, wherein each digital image is displayed in the digital presentation according to the significance measure associated with the image at 625.

For example, the computer system 105 receives the digital images 220 from the digital camera 135. The data processing apparatus 215 analyzes metadata associated with and content included in the digital images. The data processing apparatus 215 automatically determines a feature, such as a user rating, associated with each of the digital images 220 based on the analyzed metadata, the analyzed content, or both. Significance measures are automatically associated with the each of the digital images 220 based on the feature associated with the digital image, for example, significance measures proportional to the user rating are associated with each digital image. The data processing apparatus 215 detects input, such as input from one of the input devices 120, indicating that the digital images 220 should be presented in a digital media presentation. A digital media presentation, such as a digital book, is automatically generated by the data processing apparatus 215 along with a layout for the digital book. Each of the digital images 220 is displayed in the layout of the digital book according to the significance measure associated with the digital image. In some implementations, a user can select an option to receive a hard copy of the digital book. The steps performed automatically by the process 600 can be performed without user input or user intervention at any time during the step.

In some implementations, the process 600 can determine multiple features associated with each digital image. The process 600 can automatically associate a significance measure with each of the digital images based on the multiple features associated with each digital image. Each feature associated with a digital image can have, for example, a weight value used to determine the significance measure for the digital image. The weight values can make some features influence the significance measure more than others. For example, a user rating can have a larger weight than the number of times a digital image has been sent via email.

Figure 7:
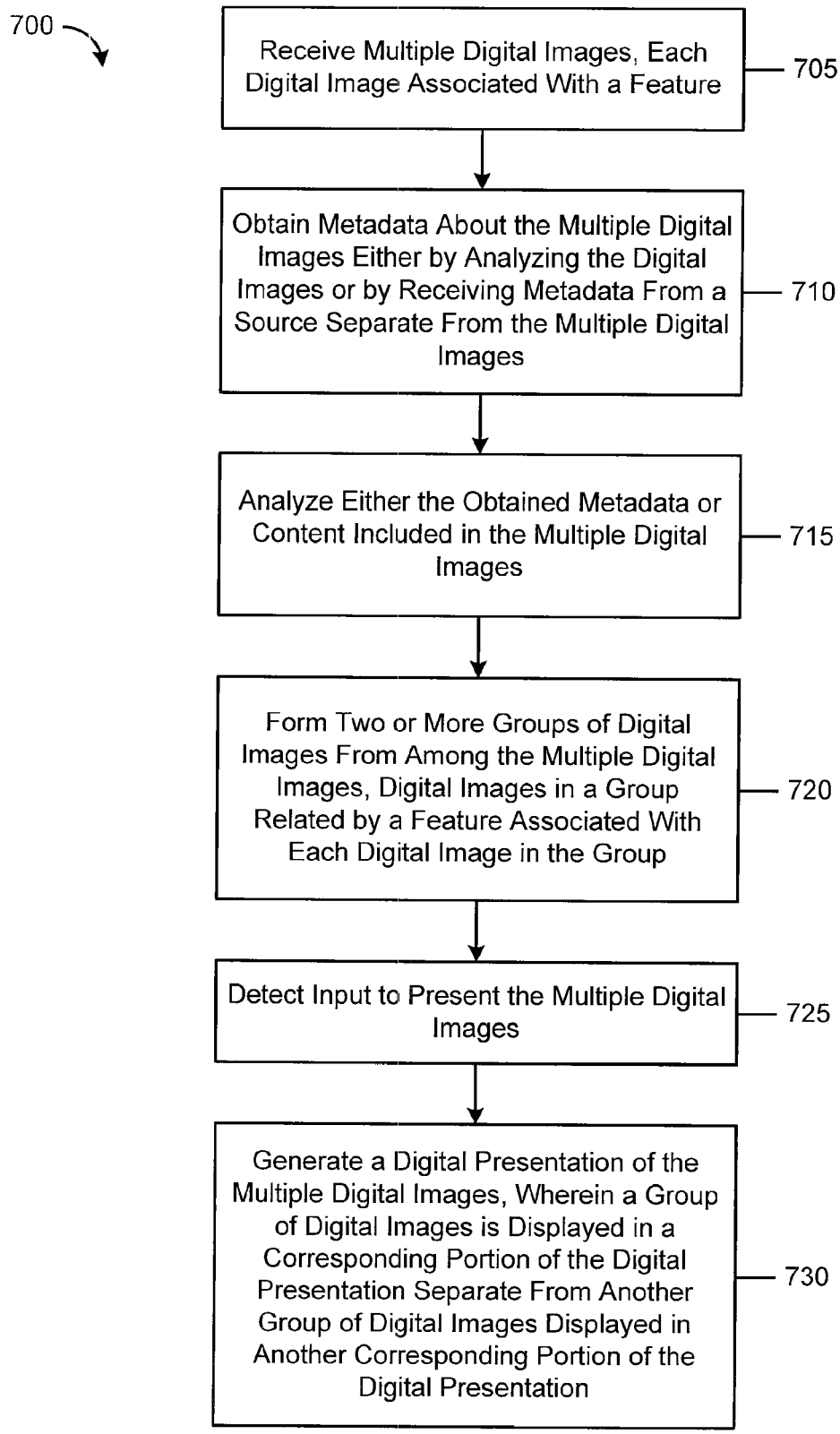
FIG. 7 shows a flowchart of an example process for generating a digital presentation and displaying multiple groups of digital images.

FIG. 7 shows a flowchart of an example process 700 for generating a digital presentation and displaying multiple groups of digital images. The process 700 can be performed by a data process apparatus, for example, data processing apparatus 215, executing computer software instructions tangible encoded on a computer readable medium. The process 700 receives multiple digital images, wherein each digital image is associated with a feature at 705. The process 700 obtains metadata about the multiple digital images either by analyzing the digital images or by receiving metadata from a source separate from the multiple digital images, or both, at 710. The process 700 analyzes either the obtained metadata or content included in the multiple digital images at 715. The process 700 forms two or more groups of digital images from among the multiple digital images, wherein digital images in a group are related by a feature associated with each digital image in the group, at 720. The process 700 detects input to present the multiple digital images at 725. The process 700 generates a digital presentation of the multiple digital images, wherein a group of digital images is displayed in a corresponding portion of the digital presentation separate from another group of digital images displayed in another corresponding portion of the digital presentation, at 730.

For example, the data processing apparatus 215 can receive the digital images 220 from the digital camera 135 and can store the digital images 220 in the data storage 210. The digital camera 135 or the data processing apparatus 215 can automatically associate the features 225 with the digital images 220. The features 225 can be stored with the digital images 220 on the data storage 210. The data processing apparatus 215 can automatically analyze the digital images 220 to obtain metadata associated with the digital images 220, such as a time of capture for each of the digital images 220. Alternatively, the data processing apparatus 215 can receive metadata, such as locations of capture in the features 235, related to the digital images 220 from the mobile computing device 125. The data processing apparatus 215 can analyze the metadata or content included in the digital images 220 to determine features 225, 235 associated with the digital images 220. Two or more clusters can be automatically formed, as described above, where the digital images in a cluster are related by a feature associated with each digital image in the cluster. User input is detected, such as selection of a button to display the digital images 220 in a digital media presentation. The data processing apparatus 215 automatically generates a digital image layout for a digital media presentation of the digital images 220. Each cluster is displayed on a different digital page spread in the digital media presentation than the other clusters. The digital media presentation can be presented to a user, for example, on the display device 110.

Figure 8:
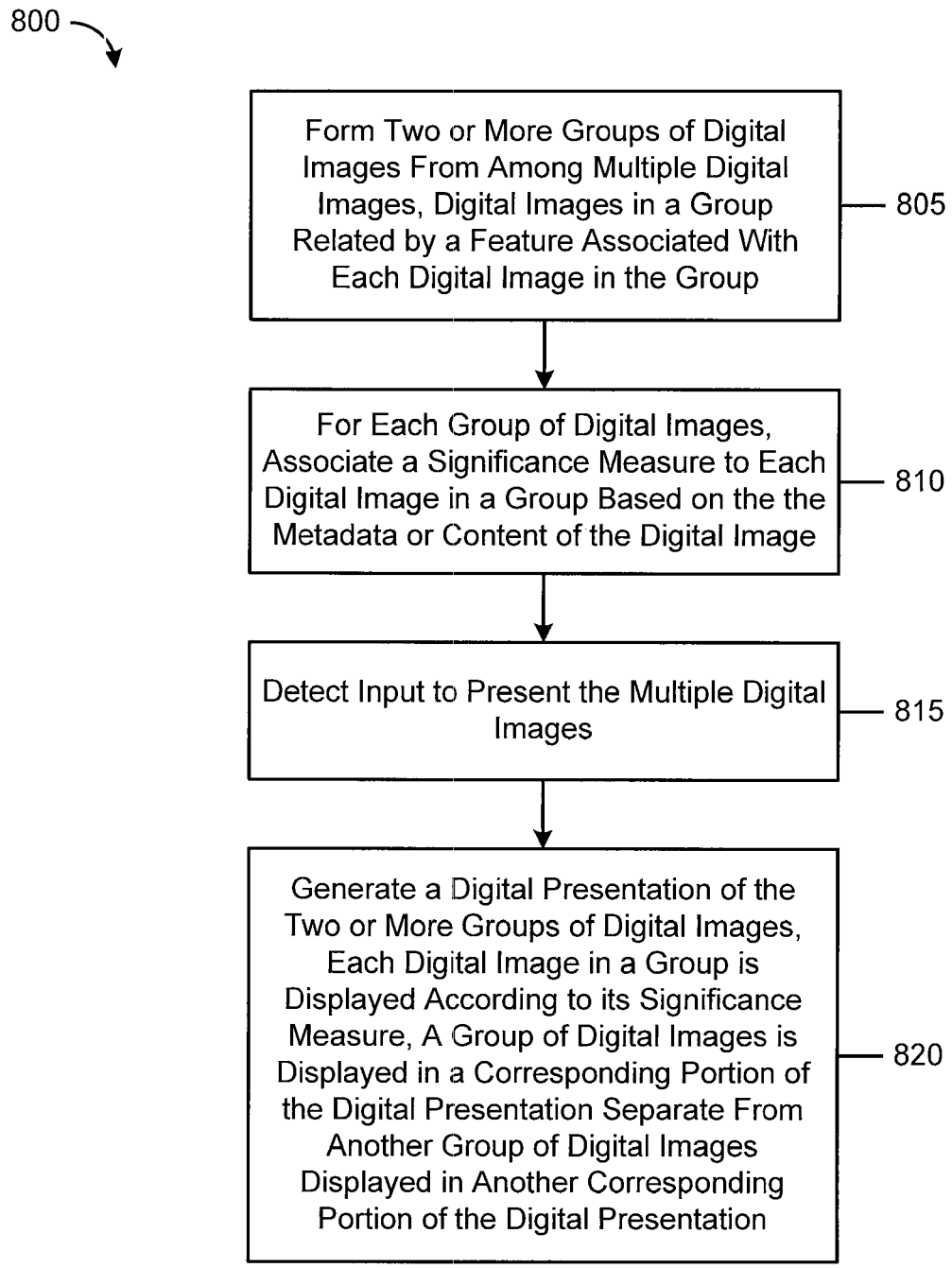
FIG. 8 shows a flow chart of an example process for generating a digital presentation and displaying digital images in groups according to significance measures.

FIG. 8 shows a flow chart of an example process 800 for generating a digital presentation and displaying digital images in groups according to significance measures. The process 800 can be executed by a system, for example, the computer system 105. The process 800 forms two or more groups of digital images from among multiple digital images, where digital images in a group are related by a feature associated with each digital image in the group at 805. For each group of digital images, the process 800 associates a significance measure to each digital image in the group based on either or both of metadata associated with each digital image or content included in each digital image at 810. The process 800 detects input to present the multiple digital images at 815. The process 800 generates a digital presentation of the two or more groups of digital images, each digital image in a group is displayed according to its significance measure and a group of digital images is displayed in a corresponding portion of the digital presentation separate from another group of digital images displayed in another corresponding portion of the digital presentation at 820.

For example, the computer system 105 can receive the digital images 230 from the mobile computing device 125. The computer system 105 can automatically form two or more groups of digital images as described above. For each group of digital images, such as each of the clusters 255, the computer system 105 can automatically associate a significance measure to each digital image in the group. The computer system 105 can associate the significance measures with the digital images based on the number of times a user has viewed the digital image. In other implementations, the computer system 105 can use other metadata or content included in the digital images, such as the number of people in the digital image, to determine significance measures for the digital images. User input is detected by the computer system 105, such as input from the input devices 120. In response to the input, the computer system 105 can automatically generate a digital media presentation without user input or user intervention during the generation. The digital media presentation can be displayed on the display device 110. In other implementations, a web server can automatically form the clusters, associate the significance values, generate the digital media presentation, and display the digital media presentation on the display device 110. A user can edit the digital media presentation. The computer system 105 or the web server can track the user edits and store the edits in a user history. The edits can be changes to themes or content in the digital media presentation. The user can select to purchase a hard copy of the digital media presentation, such as a book of the digital media presentation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, for example, an FPGA (field programmable gate array) or an ASIC (application specific integrated circuit).

The processes and logic flows can further be implemented by one system of one or more computers to execute another system of one or more computers over one or more wired or wireless networks, such as the Internet. For example, the processes and logic flows can be encoded as one or more computer programs on computer-readable media, which are executed by the other system to perform the processes.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices.

Devices suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's computing device in response to requests received from the web browser.

Embodiments of the subject matter described in this specification can be implemented in a computer system that includes a back end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computer system can include clients and servers. A client and server are generally remote from each other and typically interact through a communication network. The relationship of client and server arises by virtue of computer programs running on the respective computers and having a client-server relationship to each other. In some embodiments, a server transmits data (for example, an HTML page) to a computing device (for example, for purposes of displaying data and receiving user input from a user interacting with the computing device). Data generated at the computing device (for example, a result of the user interaction) can be received from the computing device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executing on a data processing apparatus, the method comprising:
    receiving a plurality of digital images;
    identifying, by the data processing apparatus, two or more significance measures for each of one or more digital images from the plurality of digital images, wherein each significance measure comprises a weighted score and is based on a trait of a respective digital image from the plurality of digital images;
    associating, by the data processing apparatus, a collective significance measure with each of the one or more digital images from the plurality of digital images, wherein the collective significance measure for a digital image is based, at least in part, on at least one of the two or more significance measures identified for the digital image; and
    generating, by the data processing apparatus, a digital presentation including the one or more digital images, wherein the one or more digital images are displayed in the digital presentation according to the collective significance measure associated with each of the respective one or more digital images,
    wherein the weighted score of a particular significance measure can make some traits of the respective digital image from the plurality of digital images influence the collective significance measure of the respective digital image more than other traits.

2. The method of claim 1, wherein the digital presentation is represented as a digital book having a plurality of sequentially arranged digital sheets, one or more digital sheets of the plurality of digital sheets configured to display one or more bounded regions of variable sizes, wherein a digital image is displayed within a corresponding bounded region; and
    wherein generating the digital presentation includes automatically including the one or more digital images of the plurality of digital images in a corresponding bounded region and displaying the bounded region in a digital sheet.

3. The method of claim 2, the method further comprising:
    analyzing content included in one of the plurality of digital images;
    determining that the analyzed digital image is important based on the analyzed content;
    displaying only a bounded region in a digital sheet, a size of the bounded region substantially equal to a size of the digital sheet; and
    displaying the analyzed digital image in the bounded region.

4. The method of claim 1, wherein the one or more digital images are received in a sequence, and wherein generating the digital presentation comprises arranging the one or more digital images in a plurality of sequentially arranged digital sheets in a sequence different from the sequence in which the one or more digital images are received.

5. The method of claim 1, wherein one significance measure for a first digital image of the one or more digital images comprises a determination that a user has uploaded the first digital image to a website.

6. The method of claim 1, further comprising:
    associating a higher significance measure with a first digital image relative to a second digital image based on the collective significance measure associated with the first digital image and the collective significance measure associated with the second digital image; and
    presenting the first digital image more prominently in the digital presentation relative to the second digital image.

7. The method of claim 6, wherein presenting the first digital image more prominently relative to the second digital image includes presenting the first digital image in a bounded region that is larger than a bounded region in which the second digital image is presented.

8. The method of claim 1, wherein one significance measure for a first digital image of the one or more digital images comprises a user rating associated with the first digital image by a user viewing the first digital image.

9. The method of claim 1, wherein one significance measure for a first digital image of the one or more digital images comprises a duration for which a user has viewed the first digital image.

10. The method of claim 1, wherein one significance measure for a first digital image of the one or more digital images comprises a number of times a user has transmitted the first digital image via electronic mail.

11. A non-transitory computer-readable medium encoding computer software instructions executable by a data processing apparatus to perform operations comprising:
    receiving a plurality of digital images;
    identifying, by the data processing apparatus, two or more significance measures for each of one or more digital images from the plurality of digital images, wherein each significance measure comprises a weighted score and is based on a trait of the respective digital image from the plurality of digital images;
    associating, by the data processing apparatus, a collective significance measure with each of the one or more digital images from the plurality of digital images, wherein the collective significance measure for a digital image is based, at least in part, on at least one of the two or more significance measures identified for the digital image;
    forming two or more groups of digital images from among the plurality of digital images, wherein the digital images within in a group are related based, at least in part, on a feature associated with each digital image in the group; and
    automatically generating a digital presentation including the one or more digital images, wherein a group of digital images is displayed in a corresponding portion of the digital presentation based, at least in part, on the collective significance measure of one or more digital images in the group, and wherein the group is displayed separately from another group of digital images displayed in another corresponding portion of the digital presentation,
    wherein the weighted score of a particular significance measure can make some traits of the respective digital image from the plurality of digital images influence the collective significance measure of the respective digital image more than other traits.

12. The non-transitory computer-readable medium of claim 11, wherein one significance measure for a first digital image of the one or more digital images comprises a determination that a user has uploaded the first digital image to a website.

13. The non-transitory computer-readable medium of claim 11, wherein forming two or more groups of digital images further comprises:
    comparing locations of capture of two or more of the plurality of digital images;

identifying two or more digital images having locations of capture that are substantially near each other;

including the identified two or more digital images in a formed group; and associating the corresponding locations of capture with the formed group.

14. The non-transitory computer-readable medium of claim 13, wherein the two or more digital images in the formed group are displayed in the portion of the digital representation, the operations further comprising displaying a map in the portion, the map showing the corresponding locations.

15. The non-transitory computer-readable medium of claim 11, wherein forming two or more groups of digital images further comprises:

comparing times of capture of two or more of the plurality of digital images;

identifying two or more digital images having times of capture that are substantially near each other; and including the identified two or more digital images in a formed group.

16. The non-transitory computer-readable medium of claim 13, encoding computer software instructions executable by a data processing apparatus to perform operations further comprising:

identifying one or more geographic locations of capture at which the digital images in the formed group of digital images were captured;

identifying a name of a location that collectively represents the one or more geographic locations; and displaying the name of the location in the portion, adjacent to one or more digital images in the formed group of digital images.

17. A system comprising:

a data processing apparatus; and a computer-readable medium tangibly encoding instructions executable by the data processing apparatus to perform operations comprising:

receiving a plurality of digital images;

identifying, by the data processing apparatus, two or more significance measures for each of one or more digital images from the plurality of digital images, wherein each significance measure comprises a weighted score and is based on trait of a respective digital image from the plurality of digital images;

associating, by the data processing apparatus, a collective significance measure with each of the one or more digital images from the plurality of digital images, wherein the collective significance measure for a digital image is based, at least in part, on at least one of the two or more significance measures identified for the digital image;

forming a plurality of groups of digital images from among a plurality of digital images, wherein the digital images within in a group are related based, at least in part, on a feature associated with each digital image in the group; and generating a digital presentation comprising two or more groups of the plurality of groups of digital images, wherein the digital images in a group of digital images are displayed according to the collective significance measure associated with one or more of the respective digital images, and wherein a group of digital images is displayed in a corresponding portion of the digital presentation separate from another group of digital images displayed in another corresponding portion of the digital presentation, wherein the weighted score of a particular significance measure can make some traits of the respective digital image from the plurality of digital images influence the collective significance measure of the respective digital image more than other traits.

18. The system of claim 17, wherein the operations for forming the plurality of groups of digital images further comprise:

identifying a first digital image that includes a group of faces;

comparing each face in the group of faces to a face included in a second digital image in the plurality of digital images;

determining that the face is included in the group of faces based on the comparing; and including the first digital image and the second digital image in a formed group based on the determining.

19. The system of claim 17, wherein the operations for forming the plurality of groups of digital images further comprise:

identifying a first location of capture of a first digital image;

identifying a second location of capture of a second digital image, wherein the second location of capture is substantially near to the first location of capture; and including the identified first digital image and the identified second digital image in a formed group.

20. The system of claim 17, wherein the operations for forming the plurality of groups of digital images further comprise:

identifying a first time of capture of a first digital image;

identifying a second time of capture of a second digital image, wherein the second time of capture is substantially near to the first time of capture; and including the identified first digital image and the identified second digital image in a formed group.

21. The system of claim 17, wherein the digital images in the group of digital images have metadata, the metadata including ratings of the respective digital images, wherein the operations for associating the collective significance measures with the digital images in the group of digital images comprise:

analyzing metadata associated with the digital images in the group of digital images to determine the ratings associated with the respective analyzed digital images; and identifying significance measures for the digital images, the significance measures being proportional to the ratings associated with the respective analyzed digital images.

22. The system of claim 21, the computer-readable medium tangibly encoding instructions executable by the data processing apparatus to perform operations further comprising:

determining that a collective significance measure associated with a first digital image is greater than a collective significance measure associated with a second digital image; and displaying the first digital image more prominently in the digital presentation relative to the second digital image.

23. The system of claim 22, wherein displaying the first digital image more prominently relative to the second digital image comprises:

displaying the first digital image in a first bounded region; and displaying the second digital image in a second bounded region that is smaller than the first bounded region.

24. The system of claim 22, wherein the digital presentation includes a plurality of digital sheets, one or more digital sheets of the plurality of digital sheets configured to display a digital image in a bounded region,
wherein displaying the first digital image more prominently relative to the second digital image comprises:
displaying only the first digital image in a bounded region on a first digital sheet; and
displaying the second digital image in a bounded region adjacent to one or more other digital images on a second digital sheet.

25. The system of claim 17, wherein the operations for generating the digital presentation comprise:
determining a theme for a group of images based on the feature that relates the digital images in the group and a history of themes;
applying the theme to a portion of the digital presentation in which the group of digital images are presented.

26. The system of claim 25, wherein applying a theme to the digital presentation comprises:
detecting a prominent color included in the content of the group of digital images; and
displaying the group of digital images on a background color complimentary to the prominent color.

27. The system of claim 25, wherein the history of themes is updated based on user input indicating changes to the applied theme.

28. The system of claim 17, wherein the feature that relates the digital images in the group is a geographic location at or adjacent to which the digital images in the group were captured.

* * * * *

UNITED STATES PATENT AND TRADEMARK OFFICE
CERTIFICATE OF CORRECTION

PATENT NO. : 8,988,456 B2
APPLICATION NO. : 12/893482
DATED : March 24, 2015
INVENTOR(S) : Eric Hanson et al.

Page 1 of 1

It is certified that error appears in the above-identified patent and that said Letters Patent is hereby corrected as shown below:

In the Claims

Column 30 Line 41 (Claim 11 line 19) delete the word "in";

Column 31 Line 46 (Claim 17 line 11) insert the word --a-- after the phrase "is based on".

Signed and Sealed this
Twenty-first Day of July, 2015

Michelle K. Lee
*Director of the United States Patent and Trademark Office*